US006741727B1

(12) United States Patent
Hirasawa

(10) Patent No.: US 6,741,727 B1
(45) Date of Patent: May 25, 2004

(54) APPARATUS FOR DETERMINING THE SOIL DEGREE OF PRINTED MATTER

(75) Inventor: Toshio Hirasawa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/461,278

(22) Filed: Dec. 14, 1999

(30) Foreign Application Priority Data

Dec. 14, 1998 (JP) .......................................... 10-354372

(51) Int. Cl.[7] .................................................. G06K 9/00
(52) U.S. Cl. .......................... 382/112; 382/135; 356/71
(58) Field of Search ................................ 382/112, 194, 382/199, 204, 266, 135; 356/71; 250/559.11

(56) References Cited

U.S. PATENT DOCUMENTS 4,189,235 A * 2/1980 Guter et al. ............. 356/239.1
4,650,319 A 3/1987 Stenzel et al. ................ 356/51
4,710,963 A 12/1987 Chapman et al. .............. 382/7
4,723,072 A * 2/1988 Naruse ....................... 235/454
5,055,834 A 10/1991 Chiba .................... 340/825.34
5,436,979 A * 7/1995 Gray et al. ................. 382/141
5,751,841 A * 5/1998 Leong et al. ............... 382/137
6,040,584 A * 3/2000 Liu et al. ............... 250/559.11
6,061,121 A * 5/2000 Holl et al. ..................... 356/71
6,236,745 B1 * 5/2001 Chen et al. ................. 382/135

FOREIGN PATENT DOCUMENTS

JP 60-146388 8/1985 ............ G07D/7/00
JP 6-27035 2/1994 .......... G01N/21/88
JP 08292158 A * 11/1996 .......... G01N/21/88
WO 96/36021 11/1996 ............ G07D/7/00

* cited by examiner

*Primary Examiner*—Leo Boudreau
*Assistant Examiner*—Ryan J. Miller
(74) *Attorney, Agent, or Firm*—Pillsbury Winthrop LLP

(57) ABSTRACT

An IR image input section inputs an IR image of printed matter P1, using IR light having a near-infrared wavelength. An edge emphasizing section executes edge emphasizing processing on the IR image. A fold/wrinkle extracting section extracts pixels corresponding to a fold or a wrinkle from the edge-emphasized image, counts the number of the extracted pixels, measures the average density of the extracted pixels obtained when the IR image is input thereto, and outputs the number and the average density of the extracted pixels as feature quantity data. A determining section determines the soil degree of the printed matter P1 due to a fold or a wrinkle on the basis of the feature quantity data.

9 Claims, 20 Drawing Sheets

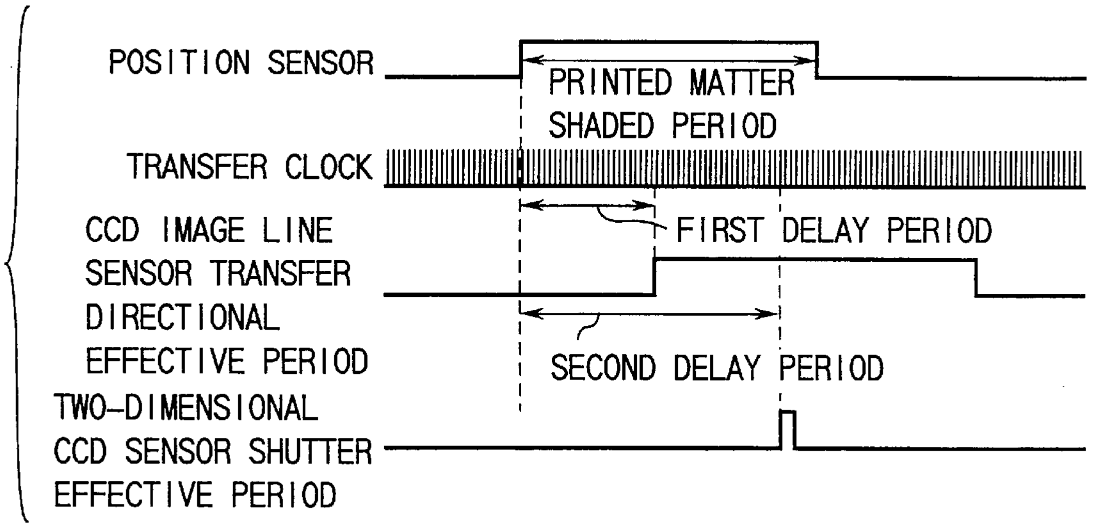
FIG.6
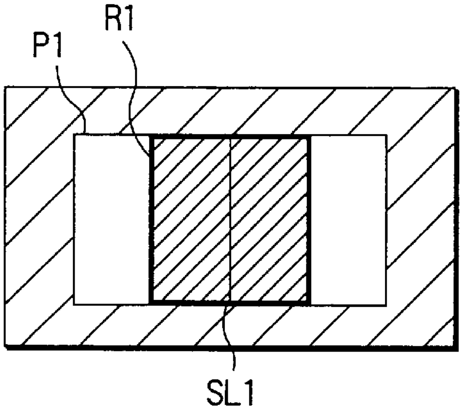
FIG.7A
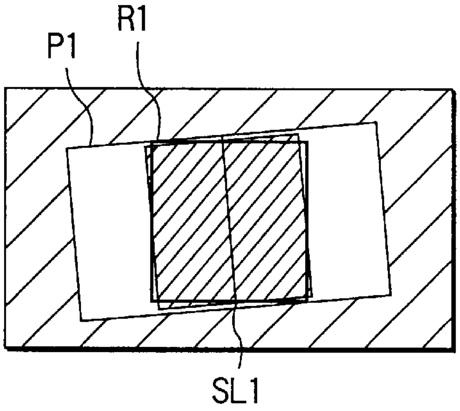
FIG.7B
| | | |
|---|---|---|
| -1 | 0 | 1 |
| -1 | 0 | 1 |
| -1 | 0 | 1 |
FIG.8A
| | | |
|---|---|---|
| -1 | -1 | -1 |
| 0 | 0 | 0 |
| 1 | 1 | 1 |
FIG.8B

APPARATUS FOR DETERMINING THE SOIL DEGREE OF PRINTED MATTER

BACKGROUND OF THE INVENTION

This invention relates to a soil degree determining apparatus for determining wrinkles, folds, etc. of a printed area of printed matter.

Many conventional apparatuses for determining soil degree of printed matter employ a method for measuring the density of a printed area or a non-printed area of printed matter to thereby detect the soil degree of the printed matter. Japanese Patent Application KOKAI Publication No. 60-146388, for example, discloses a method for dividing printed matter into a printed area and a non-printed area, setting, as reference data, an integration value of light reflected from the printed matter or light transmitted through the printed matter, and determining whether or not a soil exists on the matter. In this method, a soil such as discoloration, a spot, blurring, etc., detected as a block change in the density of a local area, is measured as a change in the integration value (i.e. sum) of the densities of pixels corresponding to the non-printed area or the printed area.

Further, there is a method for accurately determining a fold, a wrinkle, etc. of printed matter as a linear area changed in density, instead of determining dirt as a block change in the density of local area of printed matter. Japanese Patent Application KOKAI Publication No. 6-27035, for example, discloses a method for measuring a fold and wrinkle of a non-printed area.

As described above, in the prior art, the soil degree of printed matter is determined by measuring integration values of densities of pixels corresponding to the printed and non-printed areas of the printed matter, or measuring a fold and wrinkle of the non-printed area of the printed matter. However, a method for determining the soil degree of printed matter by measuring a fold and wrinkle of the "printed area" of the matter is not employed in the prior art for the following reason.

In general, the density of a soil detected as a linear area changed in density (in the case of a fold, wrinkle, etc.) is quite different from the density of a sheet of plain paper. The conventional method for measuring a fold and wrinkle in a "non-printed area" uses this density difference. Specifically, differentiation processing is performed to emphasize the change in density caused at a fold or a wrinkle, thereby extracting pixels corresponding to the fold or the wrinkle by binary processing, and calculating the number of the pixels or the average density of the pixels. Thus, the soil degree is measured.

On the other hand, concerning the "printed area", there is a case where a pattern having lines of different widths and/or including pattern components of different densities of colors is printed in the printed area, or where the entire "printed area" is coated with printed ink as in photo-offset printing. In an image obtained in the prior art by detecting light reflected from or transmitted through printed matter, a fold or a wrinkle existing in its printed area cannot be discriminated therefrom, which means that a soil cannot be extracted from the printed area. This is because the density of a soil such as a fold or a wrinkle is similar to that of the printed area. Accordingly, it is very difficult in the prior art to extract and measure a fold and/or a wrinkle in the printed area.

For example, imagine a case where the integration value of densities of pixels corresponding to ink and a soil on the entire printed area that includes a fold and/or a wrinkle is measured to detect the soil degree of the printed area. In this case, it is difficult to discriminate the density of ink from the density of a soil of the fold or the wrinkle, and the number of pixels corresponding to the fold or the wrinkle is smaller than that of the entire printed area. Moreover, variations exist in the density of ink of the printed image. For these reasons, a change in density due to the fold or the wrinkle cannot be determined from the integration value of pixel densities of the printed area.

As described above, the conventional methods cannot measure a fold and/or a wrinkle in a printed area of the printed matter.

In addition, even if a soil on a printed area or a non-printed area of printed matter due to a fold or a wrinkle can be measured, it is still difficult in the prior art to discriminate a fold or a wrinkle from a tear that will easily occur in an edge portion of the printed matter. This is because in the case of a tear differing from the case of a hole or a cutout space, it has a linear area changed in density as in a fold or a wrinkle, if two tear areas are aligned with each other and an image of the aligned areas is input.

BRIEF SUMMARY OF THE INVENTION

It is an object of the invention to provide a soil degree determining apparatus that can determine, as humans do, a fold of a printed area of printed matter, unlike the conventional apparatuses.

It is another object of the invention to provide a soil degree determining apparatus capable of discriminating between a fold and a tear of printed matter, which cannot be distinguished in the prior art.

The present invention uses a phenomenon, appearing when an image of to-be-inspected printed matter is input using light of a near-infrared wavelength, in which the reflectance or the transmittance of a fold or a wrinkle of the printed matter is much lower than that of a printed area or a non-printed area of the printed matter.

According to one aspect of the invention, there is provide a soil degree determining apparatus for determining soil degree of printed matter, comprising:

image input means for inputting an IR image of printed matter to be subjected to soil degree determination, using IR light having a near-infrared wavelength; image extracting means for extracting image data in a particular area including a printed area, from the IR image input by the image input means; changed-section extracting means for extracting, on the basis of the image data in the particular area extracted by the image extracting means, a non-reversible changed section caused when the printed matter is folded, thereby providing data concerning the changed section; feature quantity extracting means for extracting a feature quantity indicative of a degree of non-reversible change in the particular area, on the basis of the data concerning the changed section and provided by the changed-section extracting means; and determining means for estimating the feature quantity extracted by the feature quantity extracting means, thereby determining a soil degree of the printed matter. The image input means has an IR filter for filtering wavelength components other than the near-infrared wavelength.

The input of an image of printed matter using light of a near-infrared wavelength enables determination of a fold of a printed area of printed matter as humans do, unlike the conventional apparatuses.

Furthermore, the present invention can detect, by performing image input using light obliquely transmitted through printed matter, a gap formed when a tear occurs at an edge portion of the printed matter and two portions resulting from the tear displace from each other, thereby enabling distinguishing of a tear from a fold or a wrinkle, which cannot be realized in the prior art. Thus, the present invention can obtain a soil degree determination result similar to that obtained by humans.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 6 is an example of an image input timing chart;

FIGS. 7A and 7B are views showing examples of images of printed matter taken into an image memory;

FIGS. 8A and 8B are views illustrating examples of vertical and horizontal filters to be used in edge emphasizing processing;

DETAILED DESCRIPTION OF THE INVENTION

The embodiments of the invention will be described with reference to the accompanying drawings.

First, soil on printed matter to be determined in this invention will be described. In the invention, soil on printed matter includes blemishes such as "folds", "wrinkles", "tears" and "cutout spaces". The term "fold" implies, for example, an uneven portion which has occurred in a printed area when flat printed matter is deformed, and which cannot be restored to its original state. For example, the fold indicates a linear deformed portion which will occur when the printed matter is folded about its width-directional center line, and the location of which is substantially known in advance.

On the other hand, "wrinkle" indicates a deformed uneven portion which has occurred when the printed matter is deformed, and which cannot be restored to its original state, as in the case of the fold. However, in this case, the deformed uneven portion is a curved portion or a linear portion occurring when the printed matter is bent or rounded.

"Tear" indicates a portion of a certain length cut from an edge portion of printed matter and having no cutout.

"Cutout space" is formed by cutting and removing an edge portion of printed matter. Further, "hole" indicates, for example, a circular hole, formed in printed matter.

Soil includes, as well as the above-mentioned ones, scribbling, the entire stain, yellowish portions, greasy stains, blurred printing, etc.

A first embodiment of the invention will now be described.

Figure 1A:
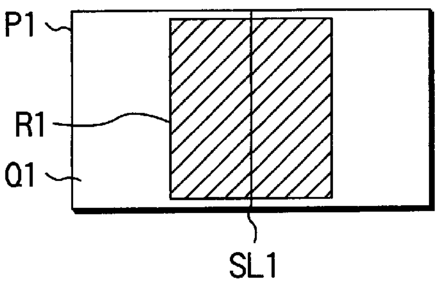
FIGS. 1A and 1B are views illustrating an example of printed matter to be checked in a first embodiment, and an example of an IR image of the printed matter.
Figure 1B:
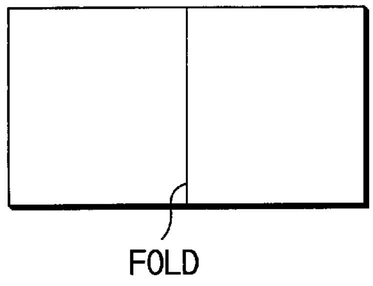

FIG. 1A shows an example of a soil on printed matter to be detected in the first embodiment. FIG. 1B shows an example of an IR image of the printed matter. Printed matter P1 shown in FIG. 1A consists of a printed area Ri and a non-printed area Q1. The printed area R1 includes a center line SL1 that divides, into left and right equal portions, the printed matter P1 that has a longer horizontal side than a vertical side in FIG. 1A. Assume that soiling such as a fold or a wrinkle is liable to occur along the center line SL1, and that ink printed on the printed area R1 is mainly formed of chromatic color ink.

Figure 2A:
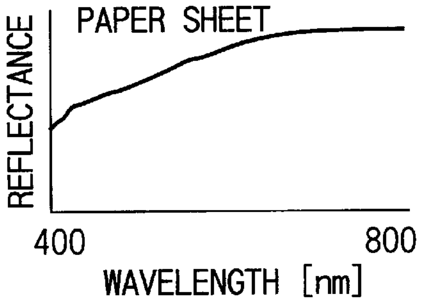
FIGS. 2A to 2C are graphs illustrating examples of spectral characteristics of a printed area of printed matter.
Figure 2B:
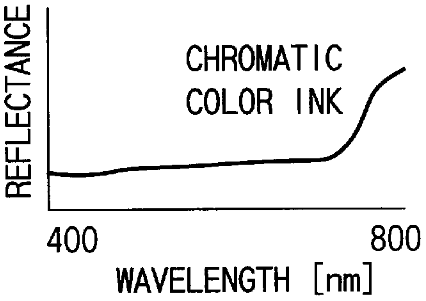
Figure 2C:
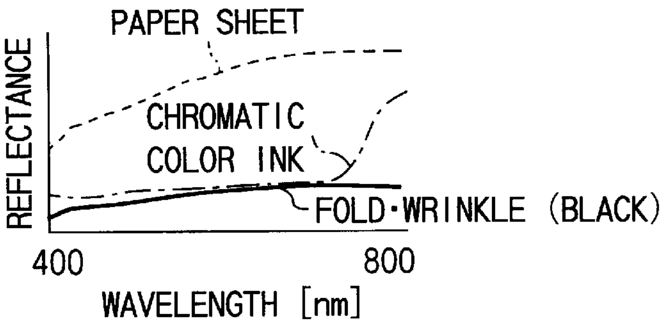

FIGS. 2A to 2C show examples of spectral characteristics of a sheet of paper, chromatic color ink, and a fold or a wrinkle. Specifically, FIG. 2A shows the tendency of the spectral reflectance of the paper sheet. The paper sheet is generally white. FIG. 2B shows the tendency of the spectral reflectance of a printed area of the paper sheet, in which the chromatic color ink is printed. It is a matter of course that various colors such as red, blue, etc. have different spectral reflectance characteristics. The tendency of the spectral reflectance characteristics of these chromatic colors is illustrated in FIG. 2B. FIG. 2C shows the tendency of the spectral reflectance characteristic of a fold or a wrinkle occurred in the printed area R1 or the non-printed area Q1, in relation to the tendency of the spectral reflectance characteristics of the paper sheet and the chromatic color ink.

In general, as is shown in FIG. 2B, the spectral reflectance characteristic of chromatic color ink printed on a paper sheet indicates that the reflectance does not significantly vary within a visible wavelength range of 400 to 700 nm, but substantially increases to the reflectance of the paper sheet shown in FIG. 2A in a near-infrared wavelength range of 800 nm or more.

On the other hand, at a fold or a wrinkle which is seen darkly as described later, the reflectance does not greatly vary even when the wavelength of light varies from the visible wavelength range to the near-infrared wavelength range of 800 nm. Although FIGS. 2A to 2C show the spectral reflectance characteristics between the wavelengths of 400 nm and 800 nm, the reflectance does not greatly vary in a near-infrared wavelength range of 800 nm to 1000 nm, unlike the visible wavelength range, but is substantially equal to the reflectance obtained in the wavelength range of 800 nm.

As is evident from FIG. 2C, the reflectances of the chromatic color ink and the fold or the wrinkle do not greatly differ from each other in a visible wavelength range of 400 nm to 700 nm, but differ in the near-infrared wavelength rage of 800 nm to 1000 nm. Moreover, the reflectances of the paper sheet and the fold or the wrinkle greatly differ from each other over the entire wavelength range.

This means that input of an image obtained by radiating the printed matter P1 with light having a near-infrared wavelength of 800 nm to 1000 nm enables separation or extraction of a dark portion due to a fold or a wrinkle from a paper sheet (Q1) and chromatic color ink (R1), as is shown in FIG. 2C.

A description will then be given of a case where image inputting is performed by transmitting, through the printed matter P1, the light with the near-infrared wavelength of 800 nm to 1000 nm. The "spectral transmittance" of chromatic color ink does not significantly vary within a visible wavelength range of 400 to 700 nm as in the case of the spectral reflectance shown in FIG. 2B, but substantially increases to the transmittance of the paper sheet in a near-infrared wavelength range of 800 nm to 1000 nm.

On the other hand, at a fold or a wrinkle, the spectral transmittance is significantly lower than that of the paper sheet as in the case of the spectral reflectance shown in FIG. 2C, since the paper sheet is bent and light reflects diffusely from the bent paper sheet. Accordingly, the fold or the wrinkle can be extracted using transmitted light of a near-infrared wavelength, as in the case of using reflected light of a near-infrared wavelength when the fold or the wrinkle is seen darkly.

A description will now be given of a case where a fold or a wrinkle is seen darkly or brightly. Where a fold or a wrinkle projects on the opposite side of flat printed matter to a light source as shown in FIG. 3A, a portion indicated by "dark portion" has a lower brightness than the other flat areas of the paper sheet and hence is seen darkly, since the amount of light from the light source is small.

Figures 3A, 3B:
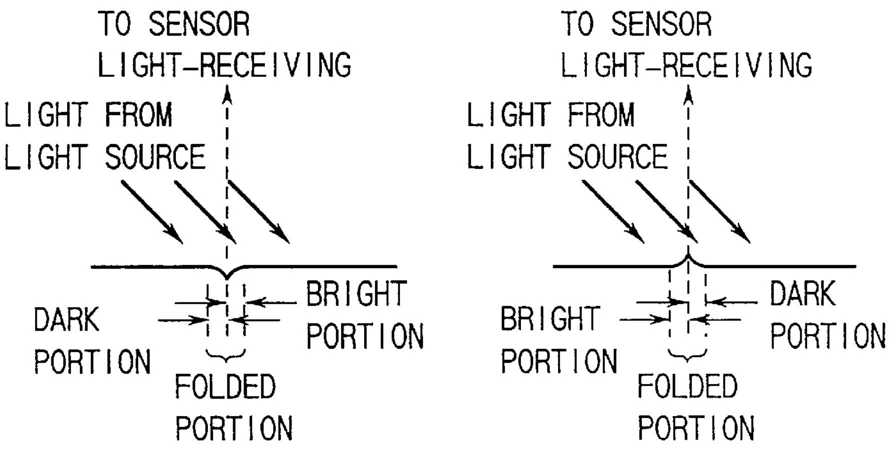
FIGS. 3A and 3B are views useful in explaining the relationship between a light source and bright and dark portions of printed matter due to a fold of the matter when performing reading processing by using reflected light.

Further, a portion indicated by "bright portion" in, FIG. 3A has a higher brightness than the other flat areas of the paper sheet and hence is seen brightly, since the bent printed surface of the "bright portion" reflects light from the light source to a sensor.

On the other hand, where a fold or a wrinkle projects on the same side of the flat printed matter as the light source as shown in FIG. 3B, a portion indicated by "bright portion" has a higher brightness for the same reason as in the "bright portion" in FIG. 3A and hence is seen brightly. Further, a portion indicated by "dark portion" in FIG. 3B has a lower brightness for the same reason as in the "dark portion" in FIG. 3A and hence is seen darkly.

As described above, in the case of using reflected light, the brightness of a fold or a wrinkle greatly varies depending upon the bending direction or angle of the printed matter or upon the angle of radiation. However, the bright portion of the fold or the wrinkle has a higher brightness than the other flat paper sheet areas, and its dark portion has a lower brightness than them. Using this phenomenon, the accuracy of detection of a fold or a wrinkle of a printed area can be enhanced.

Figure 4:
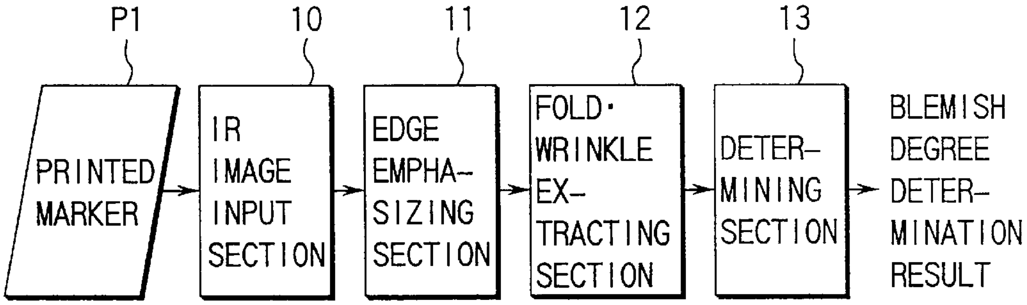
FIG. 4 is a block diagram showing the structure of a soil degree determination apparatus, according to the first embodiment, for determining a soil on printed matter.

FIG. 4 schematically shows the structure of a soil degree determination apparatus, according to the first embodiment, for determining a soil on printed matter.

An IR image input section 10 receives image data corresponding to light with a near-infrared wavelength (hereinafter referred to as "IR") of 800 nm to 1000 nm reflected from or transmitted through the printed matter P1, and then extracts, from the input image data, image data contained in a particular area of the printed matter P1 which includes the printed area R1. An edge emphasizing section 11 performs edge emphasizing processing on the image data contained in the particular area and extracted by the IR image input section 10.

A fold/wrinkle extracting section 12 binarizes the image data obtained by the edge emphasizing processing in the edge emphasizing section 11, thereby extracting pixels having greatly different brightnesses and performing feature quantity extraction processing on the pixels. A determining section 13 determines the soil degree of the printed matter P1 on the basis of each feature quantity extracted by the fold/wrinkle extracting section 12.

The operation of each of the above-mentioned sections will be described in detail.

The IR image input section 10 detects the printed matter P1 transferred, using a position sensor, and reads, after a predetermined time, IR optical information concerning the printed matter P1 with the printed area R1, using a CCD image sensor. The IR image read by the image sensor is subjected to A/D conversion and stored as digital image data in an image memory. The particular area including the printed area R1 is extracted from the stored image data. After that, the other processes including the process by the edge emphasizing section 11 are executed.

Figures 5A, 5B:
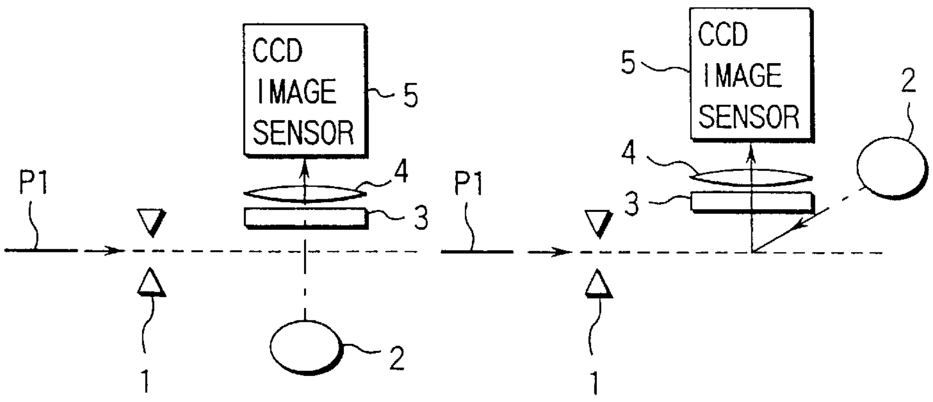
FIGS. 5A and 5B are views illustrating an example of an arrangement of an optical system that is incorporated in an IR image input section and uses transmitted light, and an example of an arrangement of an optical system that is incorporated in the IR image input section and uses reflected light, respectively.

FIGS. 5A and 5B illustrate an arrangement of an optical system that is incorporated in the IR image input section 10 and uses transmitted light, and an arrangement of an optical system that is incorporated in the IR image input section 10 and uses reflected light, respectively. In the case of the optical system using transmitted light, a position sensor 1 is provided across the transfer path of the printed matter P1 as shown in FIG. 5A. A light source 2 is located downstream of the position sensor 1 with respect to the transfer path and below the transfer path with a predetermined space defined therebetween.

The light source 2 is a source of light including IR light. Light emitted from the source 2 is transmitted through the printed matter P1. The transmitted light passes through an IR filter 3 located on the opposite side to the light source 2 with respect to the printed matter P1, thereby filtering light, other than the IR light, contained in the transmitted light. The IR light is converged onto the light receiving surface of a CCD image sensor 5 through a lens 4.

The CCD image sensor 5 consists of a one-dimensional line sensor or of a two-dimensional sensor. When the sensor 5 consists of the one-dimensional line sensor, it is located in a direction perpendicular to the transfer direction of the printed matter.

On the other hand, in the case of the optical system using reflected light, the optical system differs, only in the position of the light source 2, from the optical system using transmitted light shown in FIG. 5A. Specifically, in this case, the light source 2 is located on the same side as the IR filter 3, the lens 4 and the CCD image sensor 5 with respect to the transfer path, as is shown in FIG. 5B.

In this case, light is obliquely applied from the light source 2 to the transfer path, and light reflected from the printed matter P1 is converged onto the light receiving surface of the CCD image sensor 5 via the IR filter 3 and the lens 4.

Referring then to FIG. 6, the timing of image input will be described. When the printed matter P1 passes through the position sensor 1, the position sensor 1 detects that light is shaded by the printed matter P1. At the detection point in time, a transfer clock signal starts to be counted. In the case where the CCD image sensor 5 consists of a one-dimensional line sensor, a one-dimensional line sensor transfer-directional effective period signal changes from ineffective to effective after a first delay period, at the end of which the count value of the transfer clock signal reaches a predetermined value. This signal keeps effective for a longer period than the shading period of the printed matter P1, and then becomes ineffective.

Image data that includes the entire printed matter P1 is obtained by setting the period of the one-dimensional line sensor transfer-directional effective period signal longer than the shading period of the printed matter P1. The first delay period is set in advance on the basis of the distance between the position sensor 1 and the reading position of the one-dimensional line sensor, and also on the basis of the transfer rate.

Further, in the case where the CCD sensor 5 consists of a two-dimensional sensor, the shutter effective period of the two-dimensional sensor is set effective for a predetermined period after a second delay period, at the end of which the count value of the transfer clock signal reaches a predetermined value, thereby causing the two-dimensional sensor to execute image pick-up within the shutter effective period.

Like the first delay period, the second delay period is set in advance. Further, although in this case, the two-dimensional sensor picks up an image of the transferred printed matter P1 while the shutter effective period of the sensor is controlled, the invention is not limited to this, but the two-dimensional sensor can be made to pick up an image of the transferred printed matter P1 while the emission period in time of the light source is controlled.

FIGS. 7A and 7B illustrate examples where a particular area including the printed area R1 is extracted from input images. The hatched background has a constant density, i.e. has no variations in density. Irrespective of whether the printed matter P1 does not incline as shown in FIG. 7A, or it inclines as shown in FIG. 7B, respective areas are extracted, in which the density varies by a certain value or more over a constant distance toward the opposite sides from the width-directional central position of an input image of the printed matter P1.

The edge emphasizing section 11 will be described. The edge emphasizing section 11 performs a weighting operation on (3×3) pixels adjacent to and including a target pixel (a central pixel) as shown in FIG. 8A, thereby creating a vertical-edge-emphasized image.

Specifically, eight values obtained by adding weights shown in FIG. 8A to the densities of the adjacent pixels are further added to the density of the target pixel, thereby changing the density of the target pixel.

The edge emphasizing section 11 further obtains a horizontal-edge-emphasized image by executing a weighting operation on the (3×3) pixels adjacent to and including the target pixel as shown in FIG. 8B. By the vertical- and horizontal-edge-emphasizing process, a change in density at a fold or a wrinkle is emphasized in an image input using reflected or transmitted light. In other words, a change in density from a bright portion to a dark portion or vice versa at a fold shown in FIG. 3A or 3B is emphasized.

The fold/wrinkle extracting section 12 will be described. In this section, the vertical—and horizontal-edge-emphasized images obtained by the edge emphasizing section 11 are subjected to binary processing using an appropriate threshold value, thereby vertically and horizontally extracting high-value pixels which typically appear at a fold or a wrinkle.

After that, the number of extracted pixels, and the average density of the extracted pixels (i.e. the average density of an original image), which is assumed when the original image is input to the IR image input section 10, are obtained vertically and horizontally. Moreover, concerning the pixels extracted by binarization after the vertical-edge-emphasizing processing, variance from horizontal average position is obtained. More specifically, the variance is obtained using the following equation (1), in which a number (n+1) of extracted pixels are represented by (ik, jk) [k=0, 1, . . . , n]:

$$\mathrm{var} = \left( \sum_{k=0}^{n} ik^2 - \left( \sum_{k=0}^{n} ik \right)^2 / n \right) / n \quad (1)$$

Each of the thus-obtained feature quantities is output to the determining section 13.

The determining section 13 will now be described. The determining section 13 determines the soil degree of the printed matter P1 on the basis of each feature quantity data item extracted by the fold/wrinkle extracting section 12. A reference value used in this determination will be described later.

Figure 9:
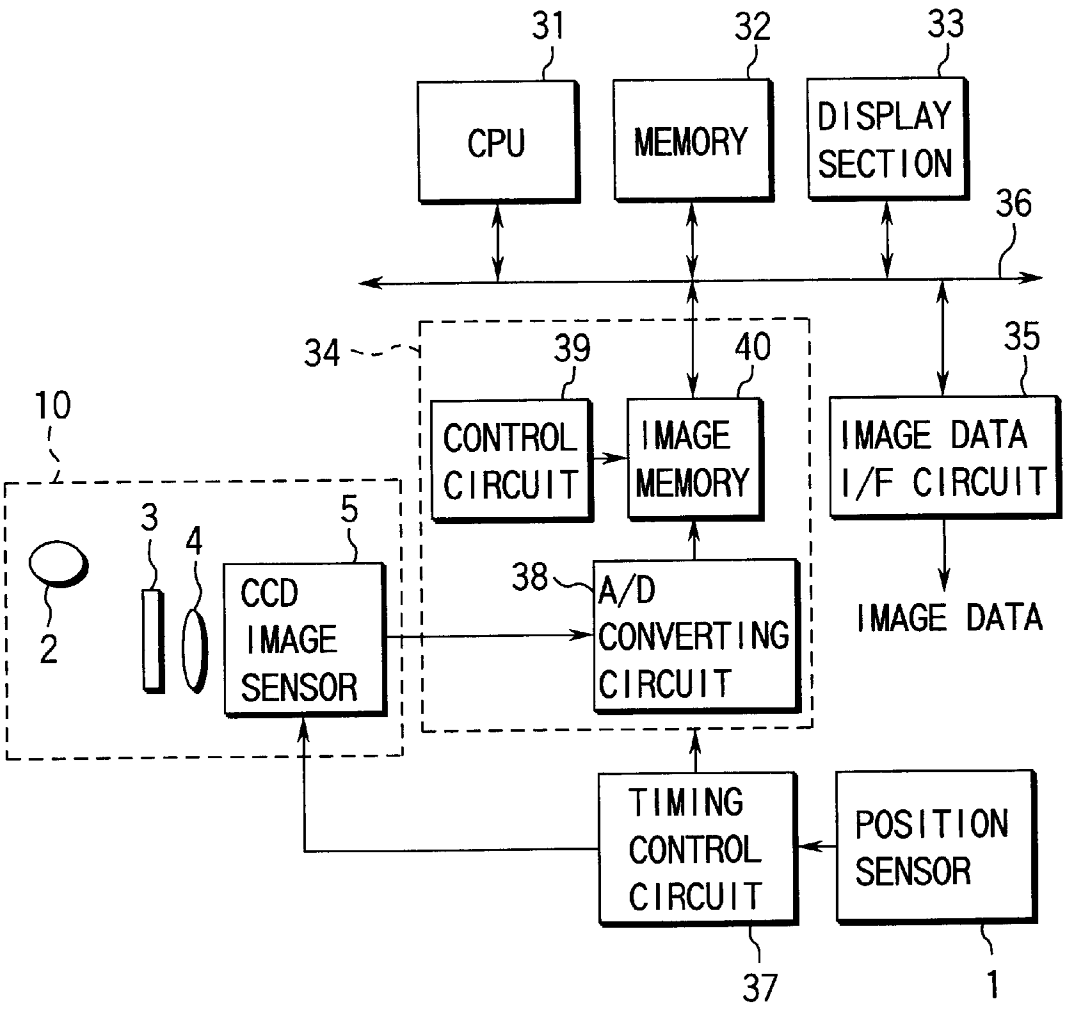
FIG. 9 is a block diagram showing in more detail the structure of the soil degree determination apparatus according to the first embodiment.

Referring to FIG. 9, the structure of the soil degree determination apparatus according to the first embodiment will be described in detail. FIG. 9 is a block diagram showing the structure of the soil degree determination apparatus.

As is shown in the figure, a CPU (Central Processing Unit) 31, a memory 32, a display section 33, an image memory control section 34 and an image-data I/F circuit 35 are connected to a bus 36.

IR image data corresponding to the printed matter P1 input by the IR image input section 10 is input to the image memory control section 34 on the basis of a detection signal from the position sensor 1 at a point in time controlled by a timing control circuit 37. The operations of the IR image input section 10, the position sensor 1 and the timing control circuit 37 have already been described with reference to FIGS. 5 and 6.

IR image data input to the image memory control section 34 is converted into digital image data by an A/D conversion circuit 38, and stored in an image memory 40 at a point in time controlled by a control circuit 39. The image data stored in the image memory 40 is subjected to image processing and determination processing performed under the control of the CPU 31 in accordance with programs corresponding to the edge emphasizing section 11, the fold/wrinkle extracting section 12 and the determining section 13 shown in FIG. 4. The memory 32 stores these programs. The display section 33 displays the determination results of the CPU 31.

The image data stored in the image memory 40 can be transferred to an external device via the bus 36 and the image-data I/F circuit 35. The external device stores, in an image storage device such as a hard disk, transferred image data on a plurality of pieces of printed matter P1. Further, the external device calculates, on the basis of the image data on the plurality of the printed matter pieces, a reference value for soil degree determination which will be described later.

Referring then to the flowchart of FIG. 10, the entire procedure of the determination processing performed in the first embodiment will be described.

First, IR image of the printed matter P1 is input using the IR image input section 10 (S1), and a particular area including the printed area R1 is extracted from the input image (S2). Subsequently, the edge emphasizing section 11 performs vertical and horizontal edge emphasizing processing, thereby creating respective edge emphasized images (S3, S4).

After that, the fold/wrinkle extracting section 12 performs binarization processing on each of the vertical and horizontal edge emphasized images, using an appropriate threshold value, thereby creating binary images (S5, S6). The number of vertical edge pixels obtained by the binarization processing is counted (S7), and the average density of the extracted pixels, which is obtained when the original image is input thereto, is calculated (S8), thereby calculating variance of horizontal positions (or coordinate values) (S9). Similarly, the number of horizontally extracted pixels is counted (S10), and the average density of the extracted pixels, which is obtained when the original image is input thereto, is calculated (S11).

Then, the determining section 13 determines the soil degree on the basis of each calculated feature quantity data item (the number of extracted pixels, the average density of the extracted pixels, the variance) (S12), and outputs the soil degree determination result (S13).

A description will now be given of the creation of the reference value used for the determining section 13 to determine the soil degree based on each feature quantity data item. First, image data on the printed matter P1 is accumulated in an external image data accumulation device via the image data I/F circuit 35. The inspection expert estimates the accumulated image samples of the printed matter P1 to thereby arrange the image samples in order from "clean" to "dirty".

Figure 10:
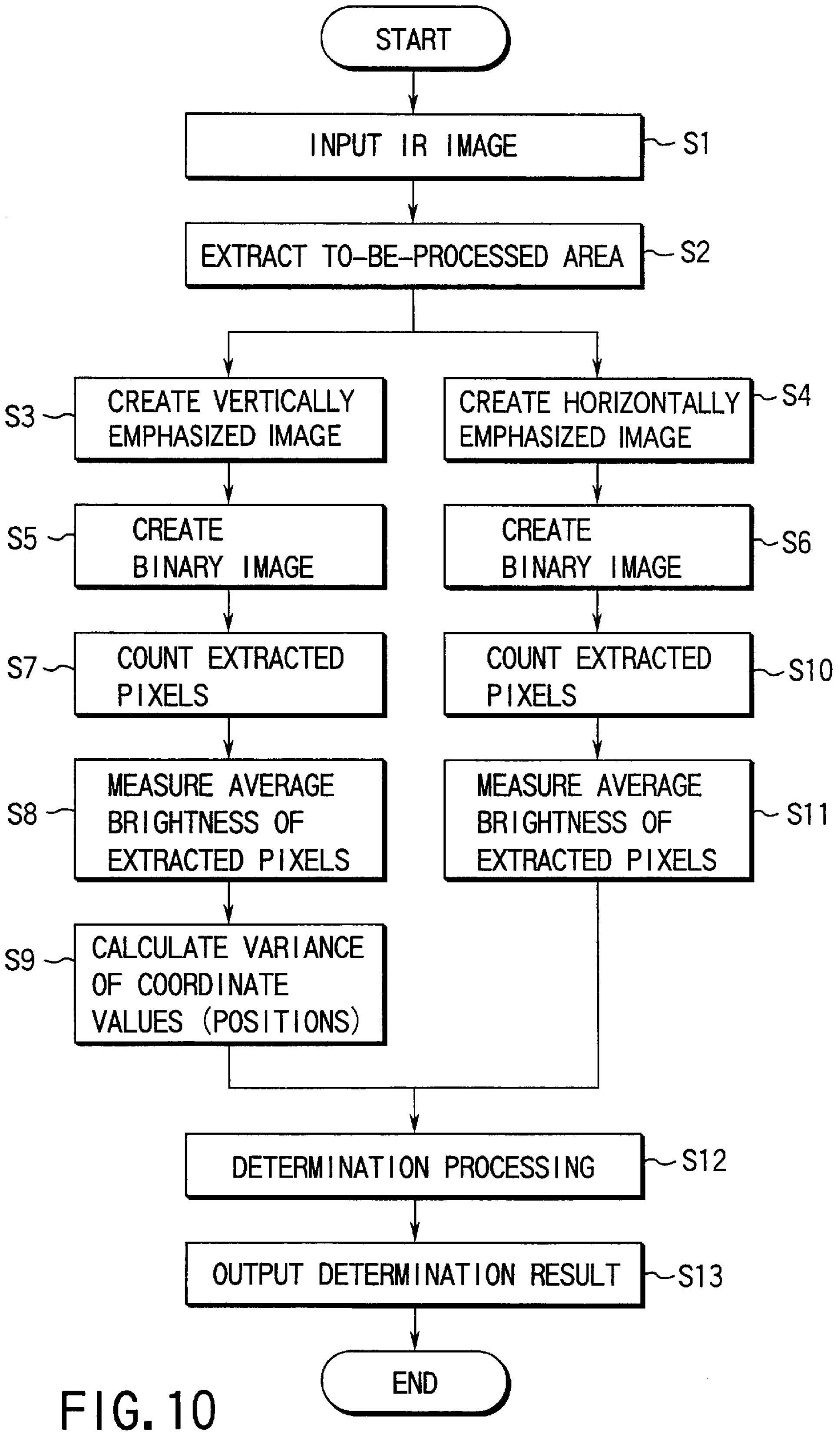
FIG. 10 is a flowchart useful in explaining the procedure of determination processing performed in the first embodiment.

Furthermore, each image data (master data) item accumulated in the image data accumulation device is once subjected to each feature quantity data extraction processing performed at the steps S2–S11 in FIG. 10 by a general operation processing device. As a result, a plurality of feature quantities are calculated for each sample of printed matter. After that, a combination rule used in combination processing for combining the feature quantities is learned or determined so that the soil degree of each piece of printed matter determined by the combination processing of the feature quantities will become closer to the estimation result of the expert.

A method for obtaining the soil degree by linear combination is considered as one of methods for obtaining the combination rule by learning. For example, a total estimation Y indicative of how degree each piece of printed matter is soiled is determined using weight data a0, a1, . . . , an (the aforementioned reference value) as in the following linear combination formula (2), supposing that the number of extracted feature quantity data items on each printed matter piece is (n+1), and that the feature quantities are represented by f1, f2, . . . , fn:

$$Y = a0 + a1 \times f1 + a2 \times f2 + \ldots + an \times fn \quad (2)$$

A second embodiment of the invention will now be described.

In the above-described first embodiment, chromatic color ink is printed in the printed area RI of the printed matter P1. If, however, ink which contains carbon is used as well as the chromatic color ink, a fold or a wrinkle cannot be extracted by the binarization processing performed in the fold/wrinkle extracting section 12 in the first embodiment.

Figure 11A:
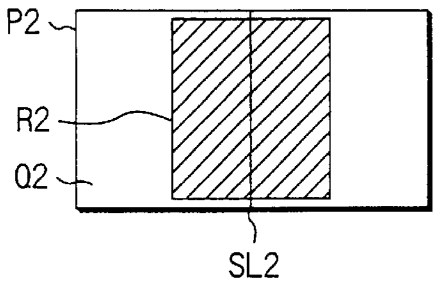
FIGS. 11A and 11B are views illustrating an example of printed matter to be checked in a second embodiment, and an example of an IR image of the printed matter.

FIG. 11A shows an example of a soil on printed matter, which cannot be extracted in the first embodiment. Printed matter P2 shown in FIG. 11A consists of a printed area R2 and a non-printed area Q2.

The printed area R2 includes a center line SL2 that divides a printed pattern and the printed matter P2 into two portions in the horizontal direction. Assume that soiling such as a fold or a wrinkle is liable to occur near the center line SL2, as in the case of the printed matter P1 having the center line SL1.

Figure 12:
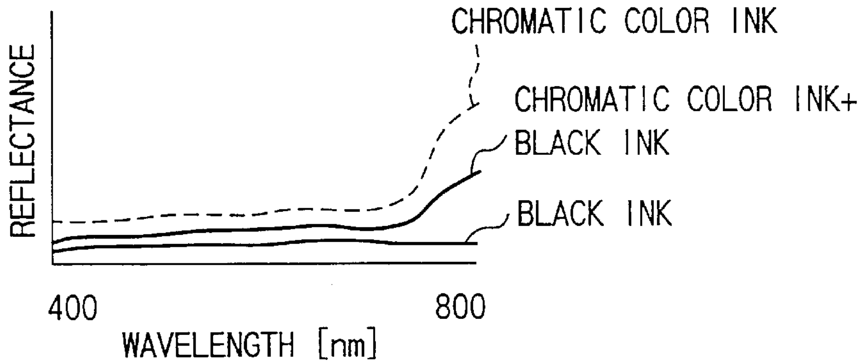
FIG. 12 is a graph showing examples of spectral characteristics in a printed area of printed matter.

The ink printed on the printed area R2 contains, for example, black ink containing carbon, as well as chromatic color ink. FIG. 12 shows examples of spectral characteristics of black ink containing carbon, and a mixture of black ink and chromatic color ink.

In the case of the chromatic color ink, its reflectance greatly differs between a visible wave-length range of 400 nm to 700 nm and a near-infrared wavelength range of 800 nm to 1000 nm, and abruptly increases when the wavelength exceeds about 700 nm. In the case of using a mixture of chromatic color ink and black ink containing carbon, its reflectance is lower than that of the chromatic color ink itself in the near-infrared wavelength range of 800 nm to 1000 nm. In the case of using black ink containing carbon, its reflectance little varies between the visible wavelength range of 400 nm to 700 nm and the near-infrared wavelength range of 800 nm to 1000 nm.

Figure 11B:
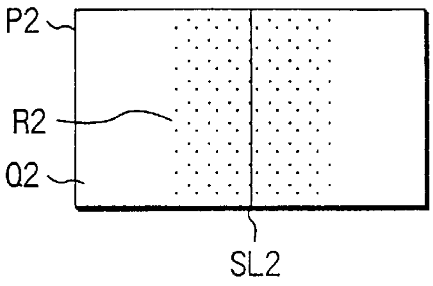

If a fold or a wrinkle is attempted to be extracted from the printed matter P2 having the above-described printed area R2 by the same method as employed in the first embodiment, noise will be extracted from a portion of the printed area R2, which contains ink other than the chromatic color ink, as is shown in FIG. 11B. Because of pixels detected as noise, the fold/wrinkle extraction processing executed in the first embodiment cannot be employed.

However, it should be noted that high-value pixels, which typically appear at a fold, are arranged in line. Using this feature enables the detection of a straight line from a binary image in which the ink-printed portion is detected as noise, thereby extracting a fold. In the second embodiment described below, the soil degree of the printed matter P2, which cannot be determined in the first embodiment, can be determined.

Figure 13:
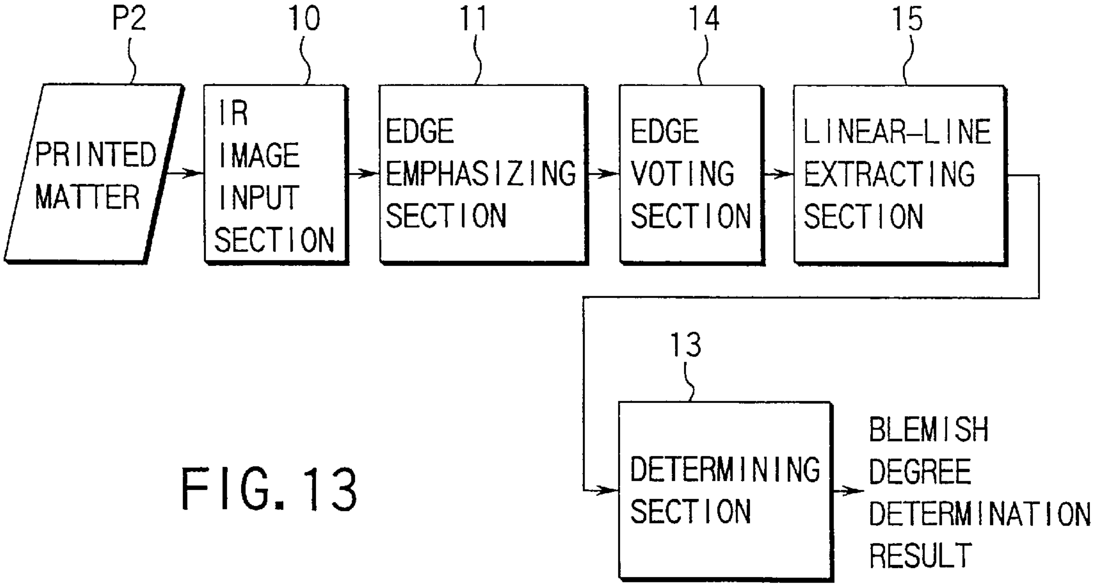
FIG. 13 is a block diagram illustrating the structure of a soil degree determination apparatus, according to the second embodiment, for determining soil degree of printed matter.

FIG. 13 is a schematic block diagram illustrating the structure of a soil degree determination apparatus, according to the second embodiment, for determining soil degree of printed matter. The soil degree determination apparatus of the second embodiment differs from that of the first embodiment in the following points: The edge emphasizing section 11 in the first embodiment creates horizontal and vertical edge emphasized images, whereas the corresponding section 11 in the second embodiment creates only a vertical edge emphasized image. Further, in the second embodiment, the fold/wrinkle extracting section 12 employed in the first embodiment is replaced with an edge voting section 14 and a linear-line extracting section 15.

The edge voting section 14 and the linear-line extracting section 15 will be described. There are two processing methods that should be changed depending upon spaces to be voted. First, a description will be given of the case of using Hough transform.

In the edge voting section 14, the vertical edge emphasized image obtained in the edge emphasizing section 11 is subjected to binarization using an appropriate threshold value, thereby extracting high-value pixels which typically appear at a fold or a wrinkle. At this time, the ink-printed portion is extracted together with noise.

Figure 14:
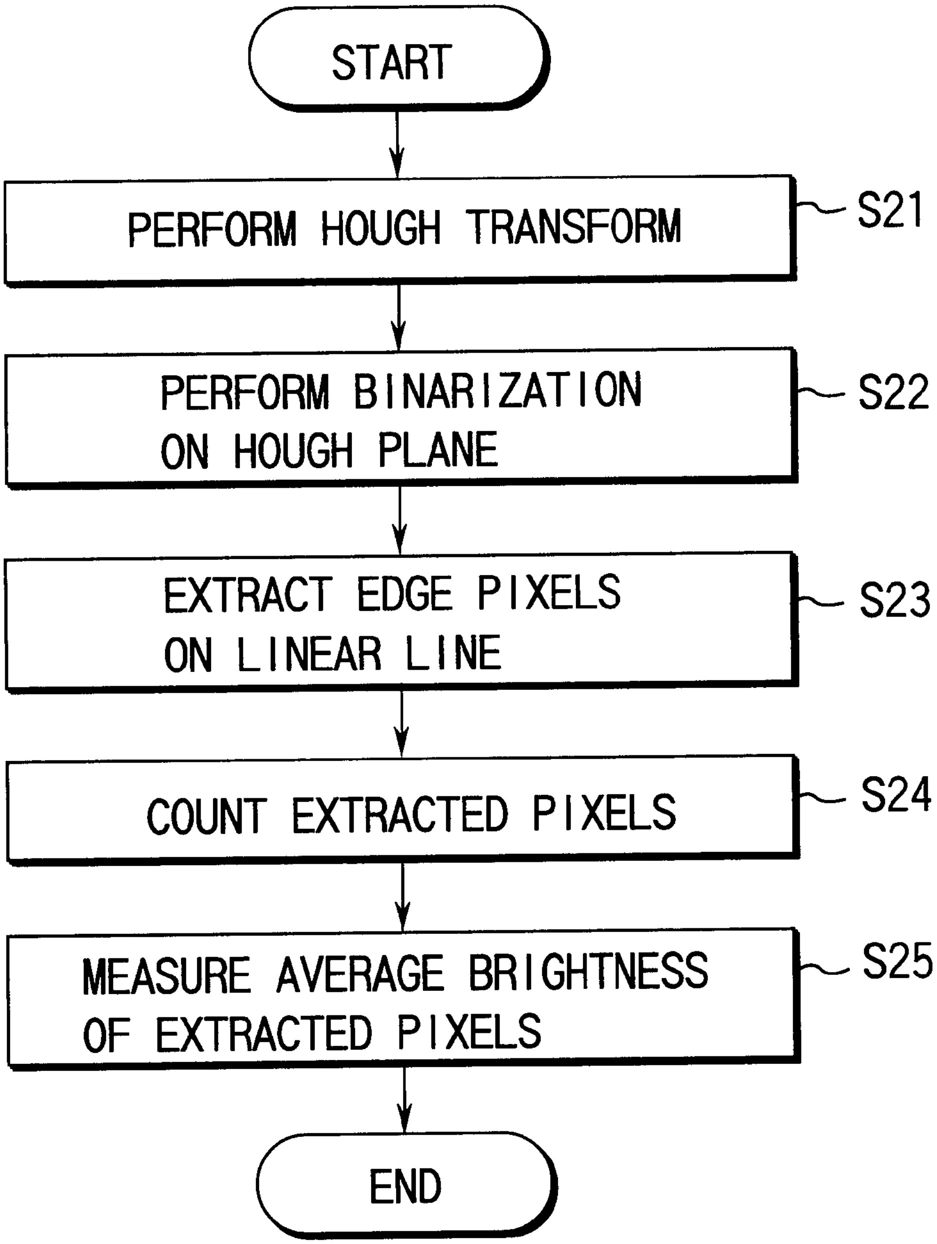
FIG. 14 is a flowchart useful in explaining the procedure of extracting and measuring pixels in line using Hough transform.

The flowchart of FIG. 14 illustrates the procedure of processing executed in the edge voting section 14 and the linear-line extracting section 15. The edge voting section 14 performs Hough transform as known processing on the obtained binary image, thereby voting or plotting the extracted pixels including noise on a Hough plane using "distance ρ" and "angle θ" as parameters (S21). Supposing that a number n of extracted pixels including noise are represented by (xk, yk)[k=1, . . . , n], each pixel is voted on the Hough plane on the basis of the following equation (3):

$$\rho = xk \times \mathrm{COS}\theta + yk \times \mathrm{SIN}\theta \quad (3)$$

The parameters ρ and θ, which serve as the axes of the Hough plane, are divided into equal units, and accordingly, the Hough plane (ρ, θ) is divided into squares with a certain side length. Where one pixel is subjected to Hough transform, a curve is formed on the Hough plane. One vote is voted in any square through which the curve passes, and the number of votes is counted in each square. Where a square having maximum votes is obtained, one linear line is determined using the equation (3).

The linear-line extracting section 15 executes the following processing. First, the counted value of votes in each square on the Hough plane (ρ, θ) is subjected to binarization using an appropriate threshold value, thereby extracting a linear-line parameter (or linear-line parameters) indicating a linear line (or linear lines) (S22). Subsequently, pixels, which are included in the pixels constituting a linear line in the printed area determined by the extracted linear-line parameters), and which are already extracted by the binarization, are extracted as pixels corresponding to a fold (S23). After that, the number of pixels on the extracted linear line is counted (S24), thereby measuring the average density of the extracted pixels, which is obtained when the original image is input thereto (S25).

As described above, extraction of pixels located only on the detected linear line can minimize the influence of background noise, resulting in an increase in the accuracy of detection of each feature quantity data item.

A description will now be given of the operations of the edge voting section 14 and the linear-line extracting section 15, which are executed when a method for performing projection on an image plane in angular directions is employed instead of Hough transform.

In the edge voting section 14, the vertical edge emphasized image obtained in the edge emphasizing section 11 is subjected to binarization using an appropriate threshold value, thereby extracting high-value pixels which typically appear at a fold or a wrinkle. At this time, the ink-printed portion is extracted together with noise.

Figure 15:
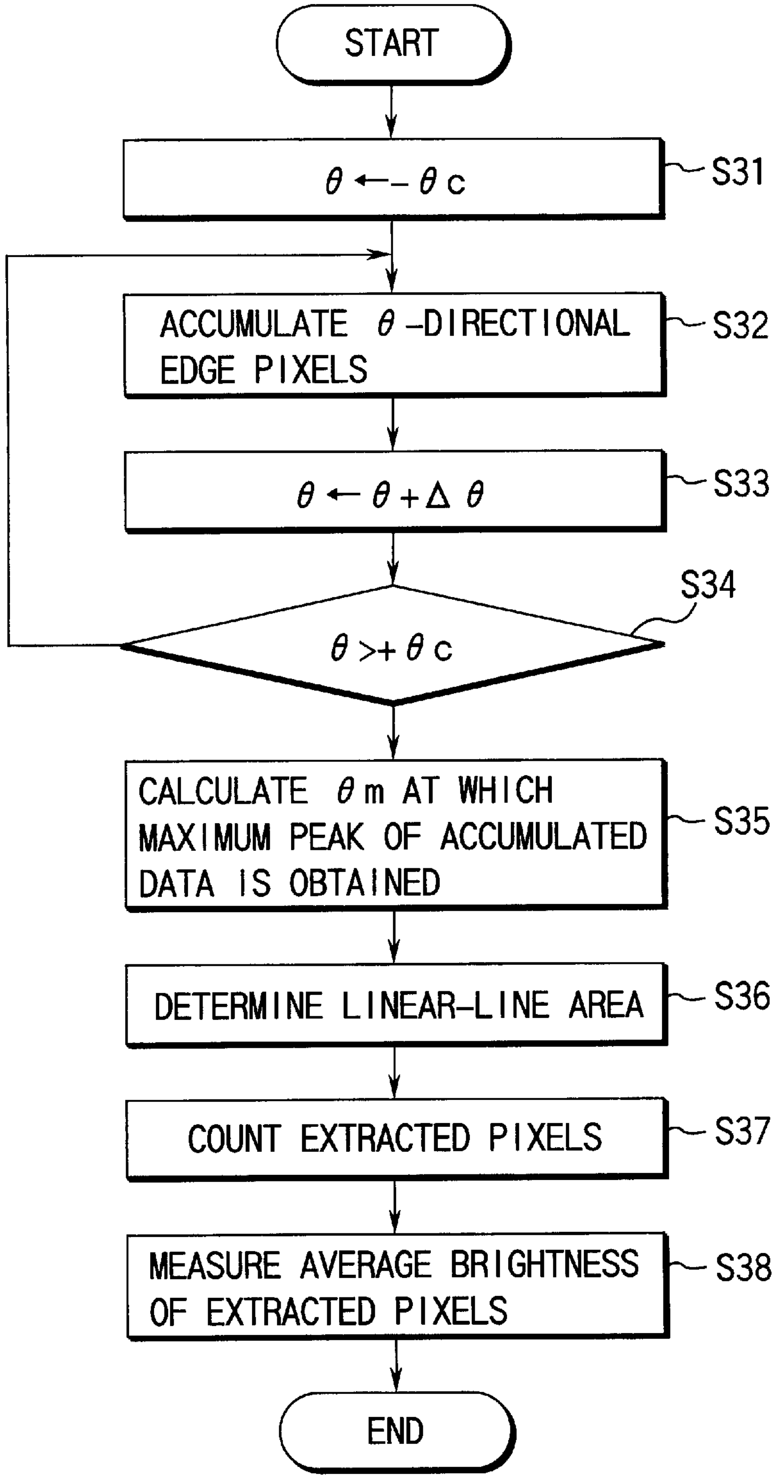
FIG. 15 is a flowchart useful in explaining the procedure of extracting and measuring pixels in line using projective processing on an image plane.

The flowchart of FIG. 15 illustrates the processing performed by the edge voting section 14 and the linear-line extracting section 15 after the extraction of pixels. In this case, first, the edge voting section 14 executes processes at steps S31–S34. More specifically, to vary the angle to the center line SL2 in units of Δθ from −θc~+θc, −θc is set as the initial value of θ (S31). Then, the binarized pixels that contain noise and are arranged in a direction θ are accumulated (S32). Subsequently, θ is increased by Δθ (S33), and it is determined whether or not θ is greater than +θc (S34). Thus, one-dimensional accumulation data is obtained in each direction θ by repeating the above processing with the value of θ increased in units of Δθ until θ exceeds +θc.

After that, the linear-line extracting section 15 calculates the peak value of the obtained one-dimensional accumulation data in each direction of θ, to detect θm at which a maximum accumulation data peak is obtained (S35). Then, a linear line area of a predetermined width is determined in the direction of θm (S36), thereby extracting only those pixels existing in the linear-line area, which are extracted by binarization. Thereafter, the number of the extracted pixels is counted by similar processing to that performed at the steps S24 and S25 of the Hough transform process (S37), and the average density of the extracted pixels obtained when the original image is input thereto is measured (S38).

Referring then to the flowchart of FIG. 16, a description will be given of the entire procedure of determining processing executed in the second embodiment.

First, an IR image of the printed matter P2 is input by the IR image input section 10 (S41), and a particular area including the printed area R2 is extracted (S42). Then, the edge emphasizing section 11 performs vertical edge emphasizing processing to create an edge emphasized image, in order to detect a vertical fold or wrinkle (S43).

Subsequently, the edge voting-section 14 performs binarization on the vertical edge emphasized image, using an appropriate threshold value (S44), thereby extracting a linear-line area by the linear-line extracting section 15, and counting the number of high-value pixels that typically appear at the extracted linear fold and measuring the average density of the pixels (S45). The processing at the step S45 is executed using either Hough transform described referring to FIG. 14 or 15, or projection processing on an image plane. After that, the determining section 13 determines the soil degree of the basis of each feature quantity data item (concerning the number and average density of extracted pixels) (S46), thereby outputting the soil degree determination result (S47).

Figure 16:
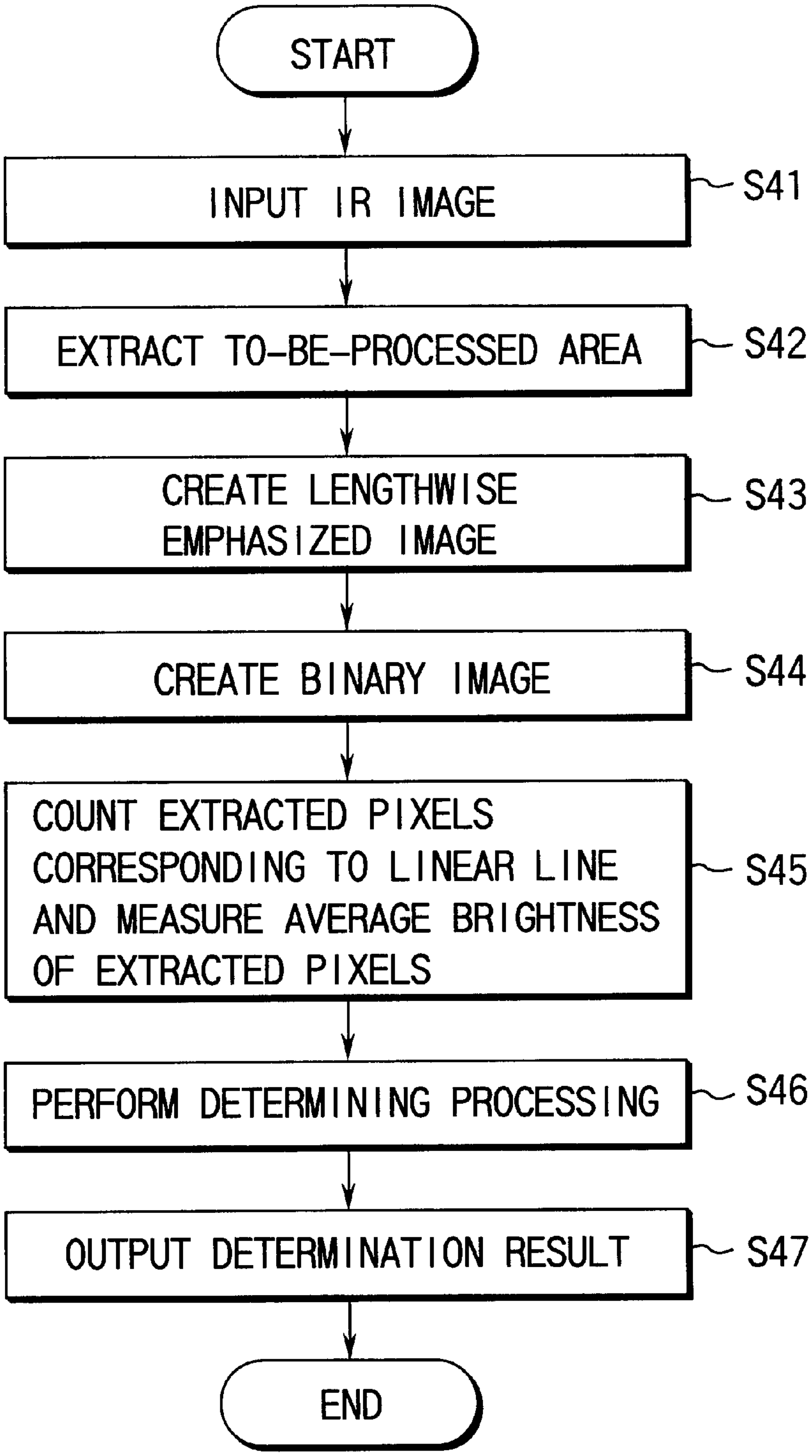
FIG. 16 is a flowchart useful in explaining the procedure of determination processing performed in the second embodiment.

The structure of the soil degree determining apparatus of the second embodiment is similar to that of the first embodiment shown in FIG. 9, except that the contents of a program stored in the memory 32 are changed to those illustrated in FIG. 16.

A third embodiment of the invention will be described.

Figure 17:
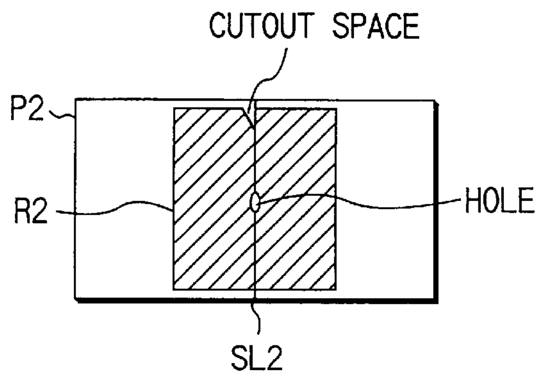
FIG. 17 is a view illustrating an example of printed matter to be checked in a third embodiment.

In the above-described second embodiment, a fold of the printed area R2 of the printed matter P2 is extracted to determine the soil degree. If, in this case, a cutout space or a hole is formed in the fold as shown in FIG. 17, it is difficult to extract only the fold for the following reason:

In the vertical edge emphasizing process using the edge emphasizing section 11 in the second embodiment, emphasizing processing is executed not only on a point of change at which the brightness is lower than that of the other horizontal points, but also on a point of change at which the brightness is higher than that of the other horizontal points. In other words, in the image input operation using transmitted IR light, even a hole or a cutout space in a fold, in which the brightness is at high level, is emphasized in the same manner as the fold whose brightness is at low level. Accordingly, the fold cannot be discriminated from the hole or the cutout space by subjecting an edge emphasized image to binary processing using an appropriate threshold value.

To solve this problem, the third embodiment uses the feature that any fold has a low brightness (high density) in an image input using transmitted IR light. In other words, an input image is subjected to horizontal maximum filtering processing instead of the edge emphasizing processing, so that only pixels contained in a change area, in which the brightness is higher than that of the other horizontal area, can be extracted. The input image is subtracted from the resultant image of a maximum value, and binary processing is executing using an appropriate threshold value, to extract only a fold. Further, individual extraction of a hole or a cutout space enables individual calculation of feature quantity data items concerning a fold, a hole or a cutout space, thereby enhancing the reliability of soil degree determination results.

Figure 18:
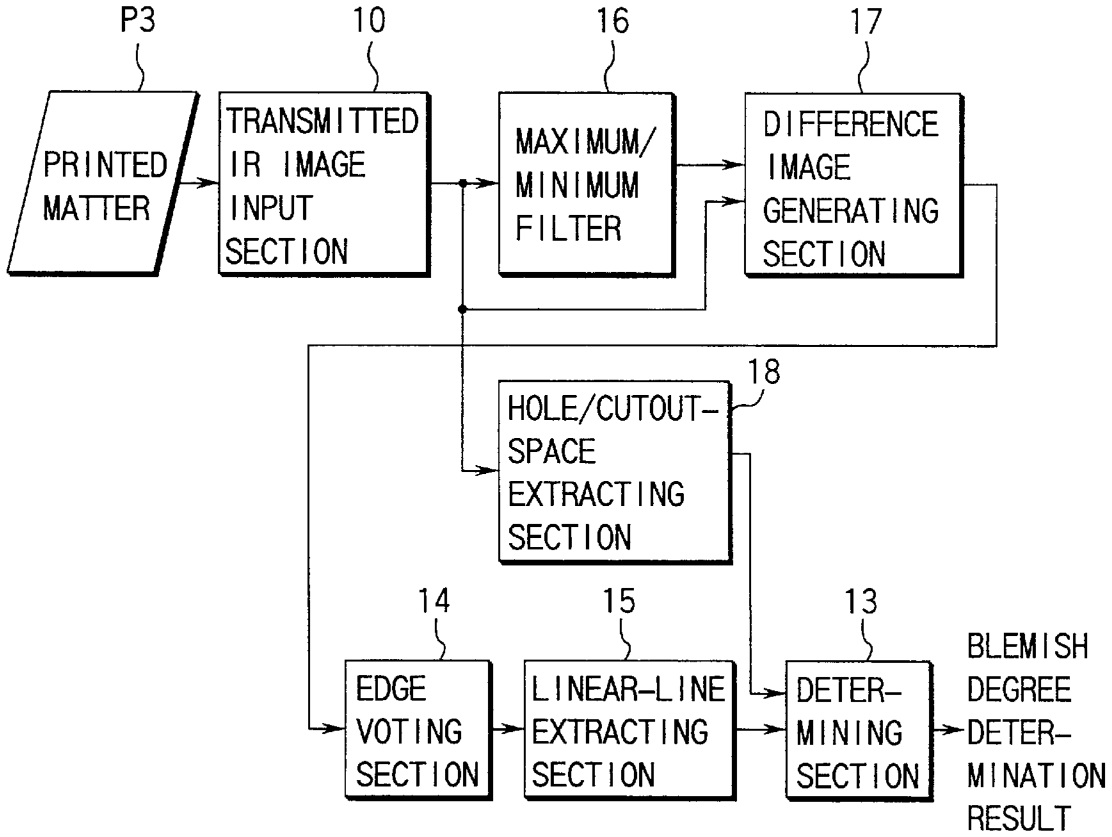
FIG. 18 is a block diagram illustrating the structure of a soil degree determination apparatus, according to the third embodiment, for determining soil degree of printed matter.

FIG. 18 schematically shows the structure of a soil degree determination apparatus, according to the third embodiment, for determining soil degree of printed matter. The apparatus of the third embodiment differs from that of the second embodiment in the following points. An IR image input section 10 shown in FIG. 18 is similar to the IR image input section 10 of FIG. 13 except that in the former, an image is input using only transmitted IR light as shown in FIG. 5A. Further, an edge voting section 14 and a linear-line extracting section 15 shown in FIG. 18 have the same structures as the edge voting section 14 and the linear-line extracting section 15 shown in FIG. 13. However, a determining section 13 in FIG. 18 differs from that of FIG. 13 in that in the former, feature quantity data concerning a hole and/or a cutout space is input. Also in the third embodiment, a determination result similar to that obtained from humans can be output by newly setting a determination reference based on each feature quantity data item, as described in the first embodiment.

A maximum/minimum filter section 16, a difference image generating section 17 and a hole/cutout-space extracting section 18 will be described.

Figure 19A:
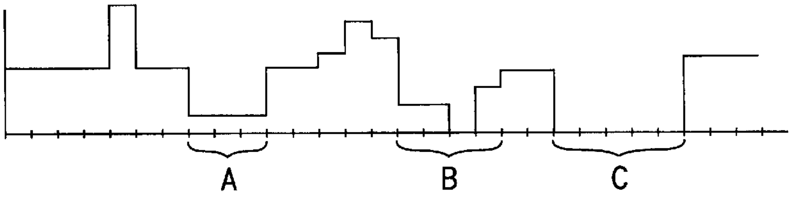
FIGS. 19A to 19D are views useful in explaining examples of maximum/minimum filtering operations and difference data generation, using one-dimensional data.
Figure 19B:
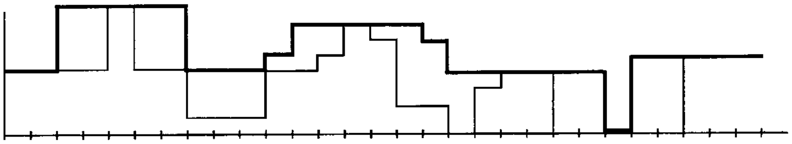

FIGS. 19A to 19D are views useful in explaining the operations of the maximum/minimum filter section 16 and the difference image generating section 17. FIG. 19A shows a brightness distribution contained in data on an original image, and FIG. 19B shows the result of a maximum filtering operation performed on the (5×1) pixels contained in the original image data of FIG. 19A, which include a target pixel and its adjacent ones. The maximum filter replaces the value of the target pixel with the maximum pixel value of horizontal five pixels that include the target pixel and horizontal four pixels adjacent thereto.

By the maximum filtering operation, in an edge area in which the brightness is low within a width of four pixels, the brightness is replaced with a higher brightness obtained from a pixel adjacent thereto, thereby eliminating the edge area. The maximum brightness of edge pixels having high brightnesses is maintained.

Figure 19C:
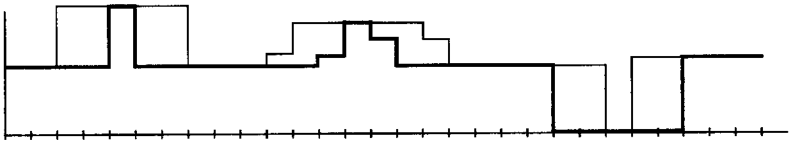

FIG. 19C shows the result of a minimum filtering operation executed on the operation result of FIG. 19B. The minimum filter performs, on the result of the maximum filtering operation, an operation for replacing the value of the target pixel with the minimum pixel value of the horizontal (5×1) pixels that include the target pixel as a center pixel. As a result, edge areas A and B shown in FIG. 19A disappear in which the brightness is low within a width of four pixels, while an edge area C with a width of five pixels is maintained, as is shown in FIG. 19C.

The difference image generating section 17 calculates the difference between the maximum/minimum filtering operation result obtained by the maximum/minimum filter section 16, and image data input by the IR image input section 10. Specifically, a difference g(i,j) given by the following equation (4) can be obtained:

$$g(i,j)=\min\{\max(f(i,j))\}-f(i,j) \quad (4)$$

where (i,j) represents the position of each pixel in the extracted area, f(i,j) represents the input image, and min {max (f(i,j))} represents the maximum/minimum filtering operation.

Figure 19D:
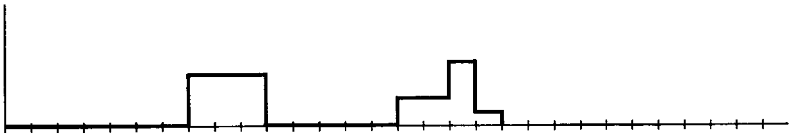

FIG. 19D shows the result of subtraction of the original image data of FIG. 19A from the minimum filtering operation result of FIG. 19C. As is evident from FIG. 19D, only the edge areas A and B in which the brightness is low within a width of four pixels are extracted.

From the operation results of the maximum/minimum filter section 16 and the difference image generating section 17, the value g(i,j) of an edge area in which the brightness is lower than that of the other horizontal area is g(i,j)>0, while the value g(i,j) of an edge area in which the brightness is higher than that of the other horizontal area is g(i,j)=0.

The hole/cutout-space extracting section 18 will be described. In the case of image input using transmitted IR light, light emitted from the light source directly reaches the CCD image sensor through a hole or a cutout space. Therefore, the brightness of the hole or the cutout space is higher than the brightness of the non-printed area of printed matter, which is relatively high. For example, in a case where an 8-bit A/D converter is used and the printed area of printed matter has a brightness of 128 (=80 h), a hole or a cutout space formed therein has a saturated brightness of 255 (=FFh). Accordingly, pixels corresponding to a hole or a cutout space can easily be extracted by detecting pixels of "255" in an area extracted from an image which has been input using transmitted IR light. The number of extracted pixels corresponding to a hole or a cutout space is counted and output.

Referring now to the flowchart of FIG. 20, the entire procedure of the determining process employed in the third embodiment will be described.

First, the IR image input section 10 inputs an IR image of the printed matter P2 (S51), thereby extracting a particular area including the printed area R2 (S52). Subsequently, the maximum/minimum filter section 16 executes horizontal maximum/minimum filtering processing to create maximum/minimum filter image (S53). Then, the difference image generating section 17 creates a difference image by subtracting the input image data from the maximum/minimum filter image data (S54).

After that, the edge voting section 14 performs binary processing on the difference image, using an appropriate threshold value (S55), and the edge voting section 14 and the linear-line extracting section 15 extract a linear-line area as a fold. Thereafter, the linear-line extracting section 15 counts the number of high-value pixels which typically appear at the extracted fold, and measures the average density of the extracted pixels obtained when the original image is input thereto (S56).

After that, the hole/cutout-space extracting section 18 measures the number of pixels corresponding to a hole or a cutout space (S57), and the determining section 13 determines the soil degree of the basis of each measured feature quantity data item (the number and the average density of extracted pixels, and the number of pixels corresponding to a hole or a cutout space) (S58), thereby outputting the soil degree determination result (S59).

Figure 20:
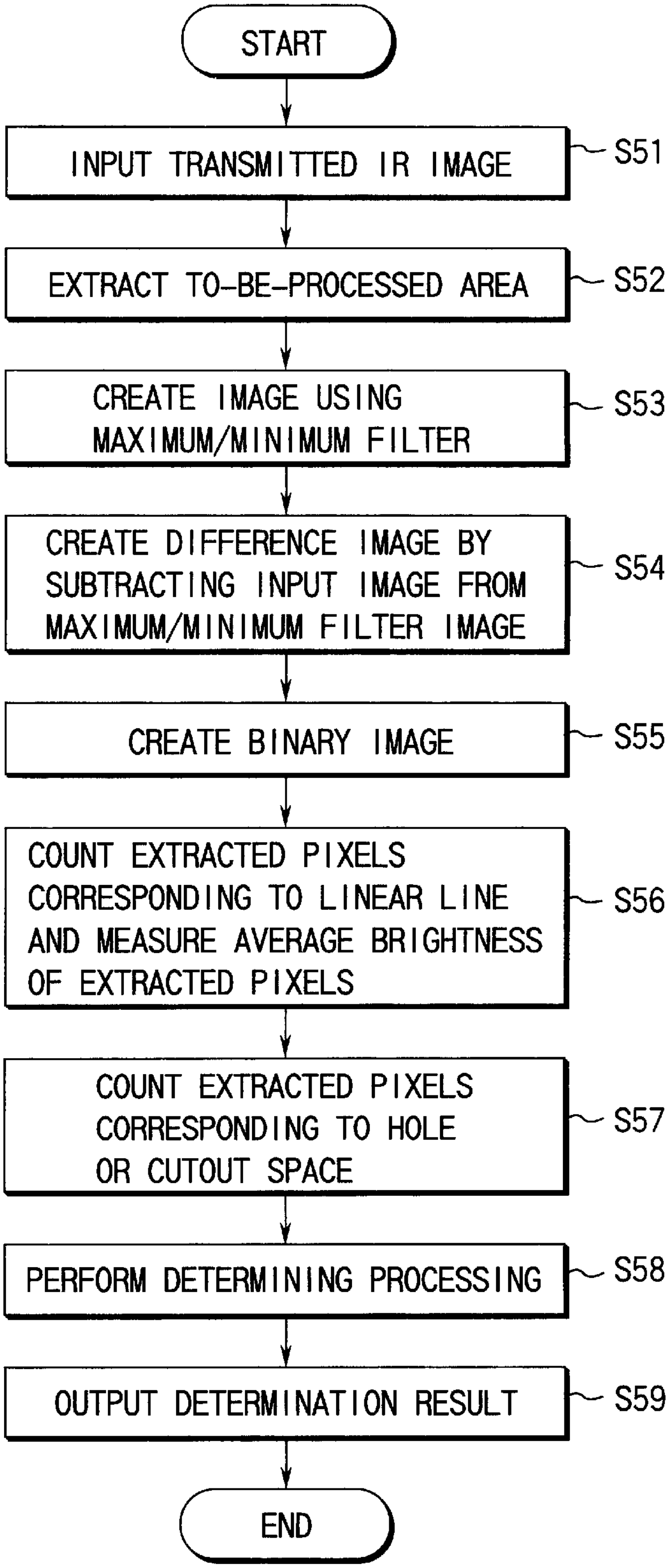
FIG. 20 is a flowchart useful in explaining the procedure of determination processing performed in the third embodiment.

The soil degree determining apparatus of the third embodiment has the same structure as the first embodiment described referring to FIG. 9, except that in the former, the contents stored in the memory 32 are changed to those illustrated in the flowchart of FIG. 20.

A fourth embodiment of the invention will be described.

In the above-described second embodiment, a fold can be extracted even when the printed area R2 of the printed matter P2 is printed with ink containing carbon, as well as chromatic color ink.

However, if in the second embodiment, the vertical lines of letters are superposed upon the center line SL2, the accuracy of extraction of a fold that will easily occur on and near the center line SL2 will reduce.

Figures 21A, 21B:
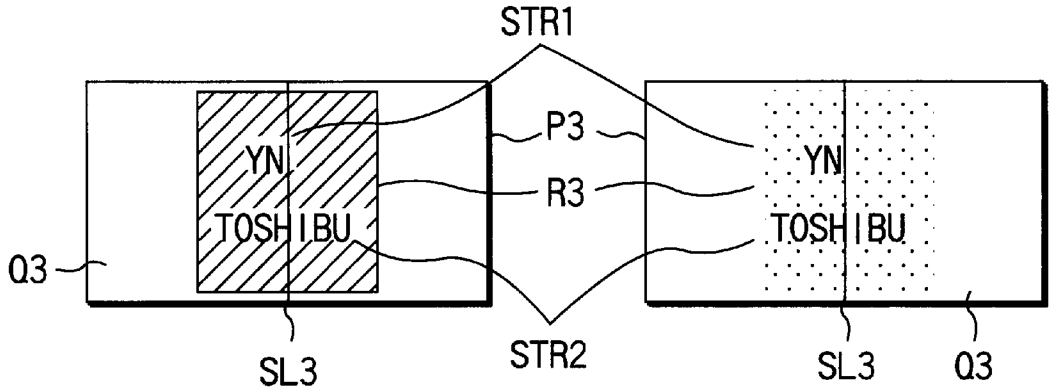
FIGS. 21A to 21C are views showing examples of printed matter to be checked in a fourth embodiment, and its IR image and to-be-masked areas.

FIG. 21A shows an example of a soil, which reduces the accuracy of determination of a soil in the second embodiment. Printed matter P3 shown in FIG. 21A consists of a printed area R3 and a non-printed area Q3. The printed area R3 includes a center line SL3 that divides, into left and right equal portions, the printed matter P3 that has a longer horizontal side than a vertical side, and also includes a printed pattern and letter strings STR1 and STR2 printed in black ink. The reflectance of the black ink is substantially equal to that of a fold. Assume that a fold or a wrinkle will easily occur near the center line SL3 as in the case of the center line SL1 of the printed matter P1.

As described in the second embodiment, a letter pattern included in a pattern in the printed area R3 will appear as noise when the pattern is subjected to binarization. Further, in the case of the printed matter P3, each vertical line of letters "N" and "H" contained in the letter strings STR1 and STR2 is aligned with the center line SL3. Accordingly, when the pattern in the printed area R3 has been binarized, the vertical lines of the letters are extracted as a fold as shown in FIG. 21B. Thus, even if there is no fold, it may erroneously be determined, because of the vertical line of each letter, that a linear line (a fold) exists.

Figure 21C:
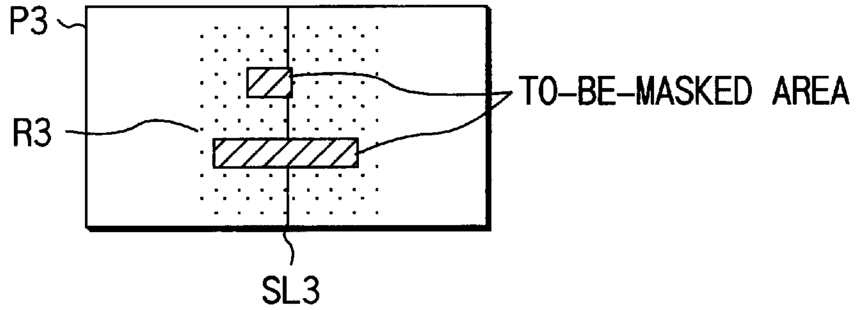
Figure 22:
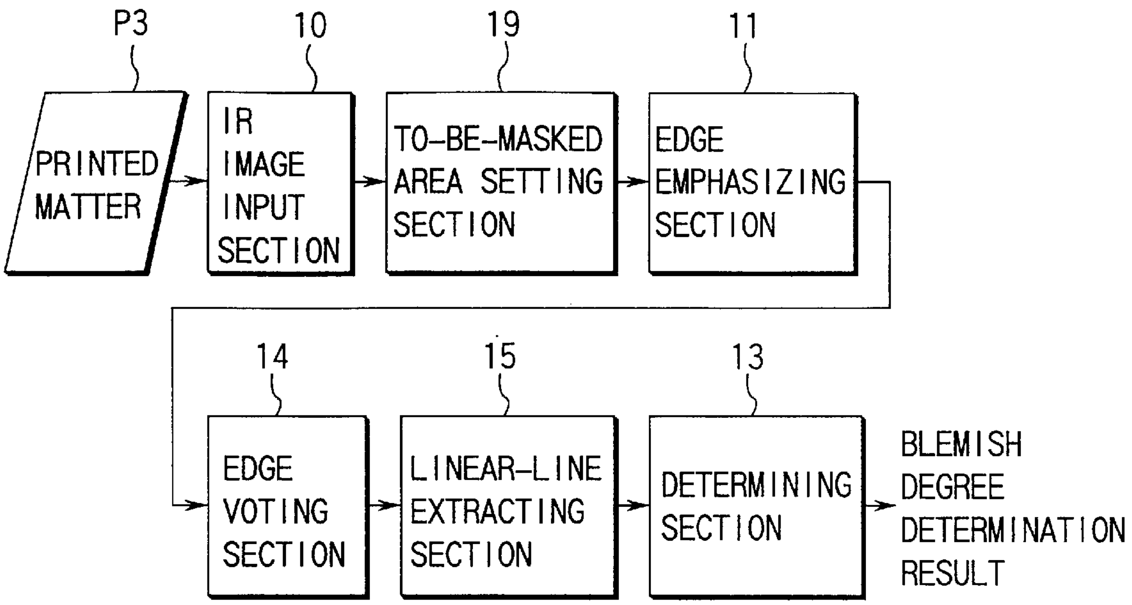
FIG. 22 is a block diagram illustrating the structure of a soil degree determination apparatus, according to the fourth embodiment, for determining soil degree of printed matter.

To avoid such erroneous determination and hence enhance the reliability of the linear line extraction processing, in the fourth embodiment, a letter-string area is excluded from an area to be processed as shown in FIG. 21C where the letter-string area is predetermined in the printed area R3 of the printed matter P3. FIG. 22 schematically shows a soil degree determining apparatus for printed matter according to the fourth embodiment. The soil degree determining apparatus of the fourth embodiment has the same structure as that of the second embodiment, except that the former additionally includes a mask area setting section 19.

The mask area setting section 19 will be described. In the case of a to-be-processed area extracted by the IR image input section 10, it is possible that a letter-string area cannot accurately be masked because of inclination or displacement of printed matter during its transfer. To accurately position a to-be-masked area so as to exclude a letter string from a to-be-processed target, it is necessary to accurately detect the position of the printed matter P3 when its image is input, and to set a to-be-masked area on the basis of the detection result. This processing is executed in accordance with the flowchart of FIG. 23.

First, the entire portion of an input image of the printed matter P3, which is input so that the entire printed matter P3 will always be included, is subjected to binarization processing (S61). At a step S62, the positions of two points on each side of the printed matter P3 are detected, in order to detect an inclination of the printed matter, by sequentially detecting horizontal and vertical pixel-value-changed points beginning from each end point of the resultant binary image. Then, the positions of the four linear lines of the printed matter P3 are determined, thereby calculating intersections between the four linear lines, and determining the position of the printed matter.

At a step S63, the position of any to-be-masked area in the input image is calculated on the basis of the position and the inclination calculated at the step S62, and also on the basis of prestored position information on the to-be-masked area (s) of the printed matter P3.

Referring to the flowchart of FIG. 24, the entire procedure of determining processing performed in the fourth embodiment will be described.

Figure 23:
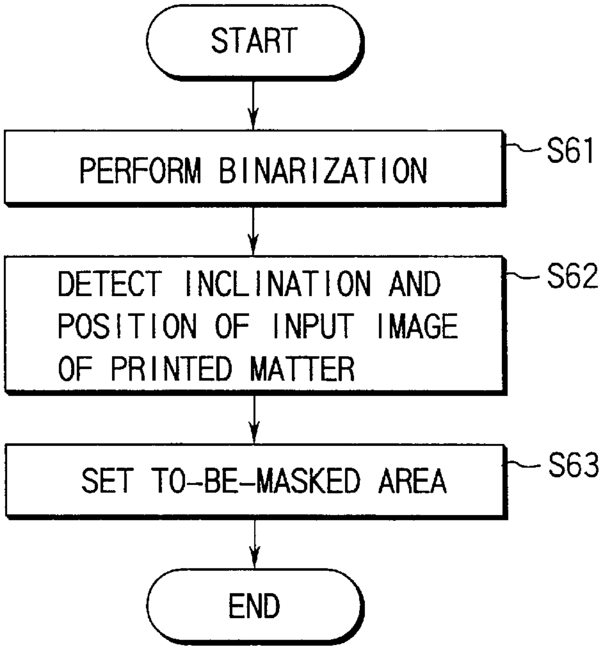
FIG. 23 is a flowchart useful in explaining the procedure of mask area setting processing.

First, the IR image input section 10 inputs an IR image of the printed matter P3 (S71), thereby extracting a particular area including the printed area R3 and setting a to-be-masked area by the mask area setting section 19 as illustrated in FIG. 23 (S72). Subsequently, the edge emphasizing section 11 executes vertical emphasizing processing to create a vertical-edge-emphasized image (S73).

After that, the edge voting section 14 executes binarization of the vertical-edge-emphasized image, using an appropriate threshold value (S74). At the next step S75, the edge voting section 14 and the linear line extracting section 15 detect a linear-line area, and obtain the number of high-value pixels that typically appear at a fold in the extracted linear-line area, and also the average density of these pixels, which is obtained when the original image is input thereto. The determining section 13 determines the soil degree of the basis of the measured feature quantity data (the number and the average density of the extracted pixels obtained when the original image is input) (S76), thereby outputting the soil degree determination result (S77).

Figure 24:
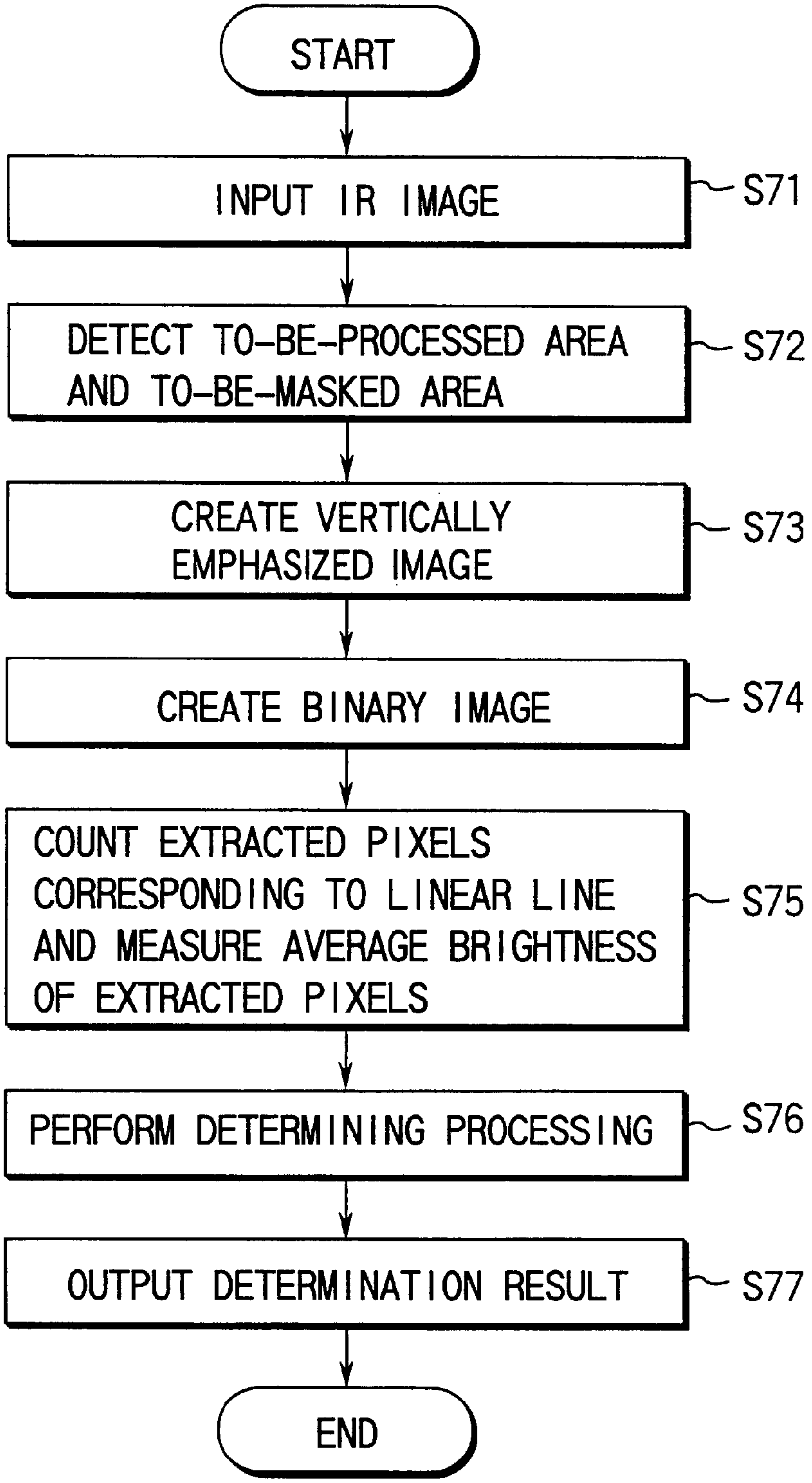
FIG. 24 is a flowchart useful in explaining the procedure of determination processing performed in the fourth embodiment.

The soil degree determining apparatus of the fourth embodiment has the same structure as the first embodiment described referring to FIG. 9, except that in the former, the contents stored in the memory 32 are changed to those illustrated in the flowchart of FIG. 24.

A fifth embodiment of the invention will be described.

Figure 25:
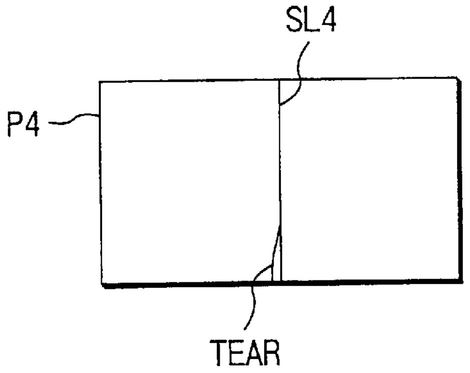
FIG. 25 is a view showing an example of printed matter to be checked in a fifth embodiment.
Figure 26A:
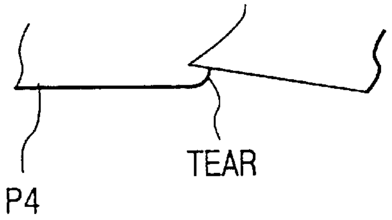
FIGS. 26A and 26B are views showing examples of tears formed in printed matter.
Figure 26B:
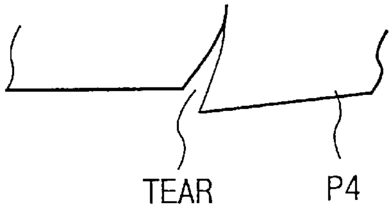

FIG. 25 shows an example of printed matter that has a soil to be checked in the fifth embodiment. Printed matter P4 shown in FIG. 25 has a tear at an edge thereof. Where a tear occurs in the flat printed matter P4, one of two areas divided by the tear generally deforms at an angle (upward or downward) with respect to the flat printed surface as shown in FIGS. 26A and 26B. In the case of inputting an image by using usual transmitted light, a light source is located perpendicular to the printed surface, while a CCD image sensor is located opposite to the light source, with the printed surface interposed therebetween.

If an image having a tear is input in the above structure, it is possible, unlike a hole or a cutout space, that light from the light source will not enter the CCD image sensor. Specifically, like a fold, a tear is detected as a change in brightness from a bright portion to a dark portion, depending upon the angle, to the printed surface, of a line formed by connecting the light source and the CCD image sensor. Further, even if light from the light source will directly enter the CCD image sensor when the printed surface and the tear form a certain angle, it cannot directly enter the CCD sensor if the tear is formed as shown in FIG. 26A or 26B.

To distinguish a tear from a fold or a wrinkle in a reliable manner, at least two image input means must be used.

Figure 27:
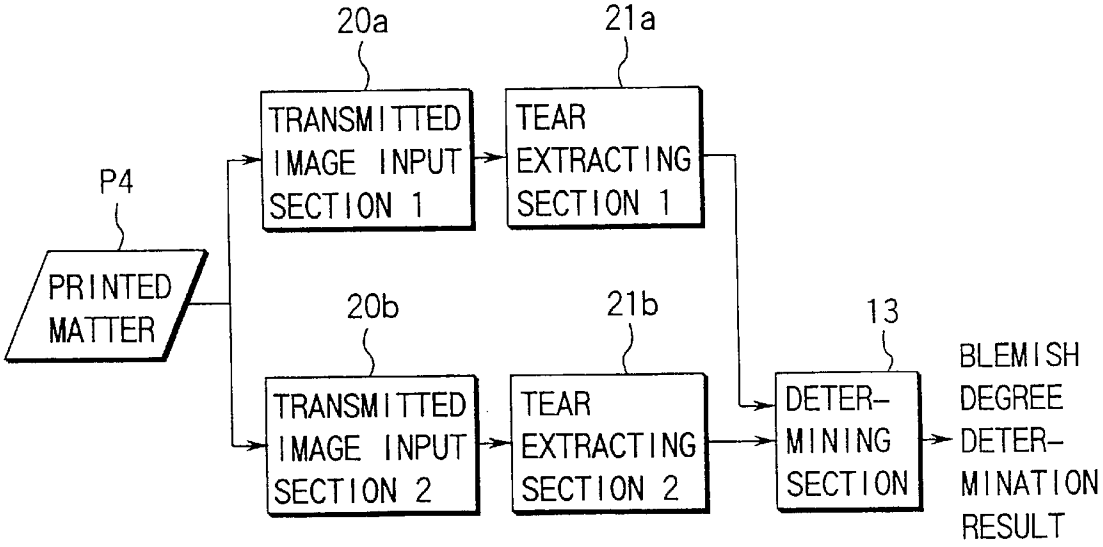
FIG. 27 is a block diagram illustrating the structure of a soil degree determination apparatus, according to the fifth embodiment, for determining soil degree of printed matter.

FIG. 27 schematically illustrates the structure of a soil degree determining apparatus for printed matter according to the fifth embodiment. The soil degree determining apparatus of the fifth embodiment has two transmitted-image input sections 20*a* and 20*b* in a different direction from its transfer direction. The sections 20*a* and 20*b* input respective image data items obtained using transmitted light and corresponding to the printed matter P4 that includes a soil having occurred near the center line SL4, thereby extracting a particular area contained in the input image data items.

Tear extracting sections 21*a* and 21*b* extract a torn area from the image data contained in the particular area extracted by the transmitted-image input sections 20*a* and 20*b*, and measure the number of pixels included in the torn area. The determining section 13 determines the soil degree of the printed matter P4 on the basis of the number of pixels measured by the tear extracting sections 21*a* and 21*b*.

The transmitted-image input sections 20*a* and 20*b* will be described. Each of these sections 20*a* and 20*b* has the same structure as the IR image input section 10 (with the structure shown in FIG. 5A) except that the former does not have the IR filter 3.

Figure 28A:
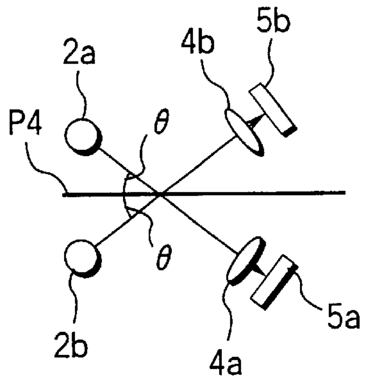
FIGS. 28A and 28B are views illustrating examples of arrangements of an optical system, using light transmitted through the printed matter, which is used in an IR image input section.
Figure 28B:
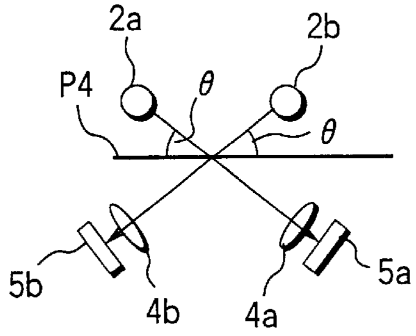

FIGS. 28A and 28B show optical arrangements of the transmitted-image input sections 20*a* and 20*b*. To detect vertically displaced tears as shown in FIGS. 26A and 26B, it is necessary to arrange, as shown in FIG. 28A or 28B two input sections having an optical angle of ±θ (0<θ<90°) with respect to the printed surface. The closer the value of θ to "0", the easier the detection of a tear and the higher the detection accuracy of the tear. This is because the closer to "0", the greater the physical displacement of the tear.

Specifically, in the structure shown in FIG. 28A, a first light source 2*a* is located above the printed matter P4, and a first lens 4*a* and a first CCD image sensor 5*a* are located below the printed matter P4, opposed to the first light source 2*a*. In addition, a second light source 2*b* is located below the printed matter P4, and a second lens 4*b* and a second CCD image sensor 5*b* are located above the printed matter P4, opposed to the second light source 2*b*.

In the structure shown in FIG. 28B, the first and second light sources 2*a* and 2*b* are located above the printed matter P4, while the first and second lenses 4*a* and 4*b* and the first and second CCD image sensors 5*a* and 5*b* are located below the printed matter P4, opposed to the light sources 2*a* and 2*b*, respectively.

The tear extracting sections 21*a* and 21*b* will be described. Since these sections have the same structure, a description will be given only of the tear extracting section 21*a*. The tear extracting section 21*a* executes similar processing on image data contained in the particular area extracted by the transmitted-image input section 20*a*, to the processing executed by the hole/cutout-space extracting section 18 shown in FIG. 18.

Specifically, where an 8-bit A/D converter, for example, is used and the paper sheet has a brightness of 128 (=80 h), if the transmitted-image input section 20*a* receives direct light through a tear as through a fold, it outputs a saturated value of 255 (FFh). Therefore, if a pixel that assumes a value of "255" is detected in the particular area extracted by the transmitted-image input section 20*a*, a tear can be easily detected. The tear extracting section 21*a* counts and outputs the number of thus-extracted pixels corresponding to a tear.

The determining section 13 will be described. The determining section 13 sums the counted numbers of pixels corresponding tears to determine the soil degree of the printed matter P4. A reference value used in the determination is similar to that used in the first embodiment.

Figure 29:
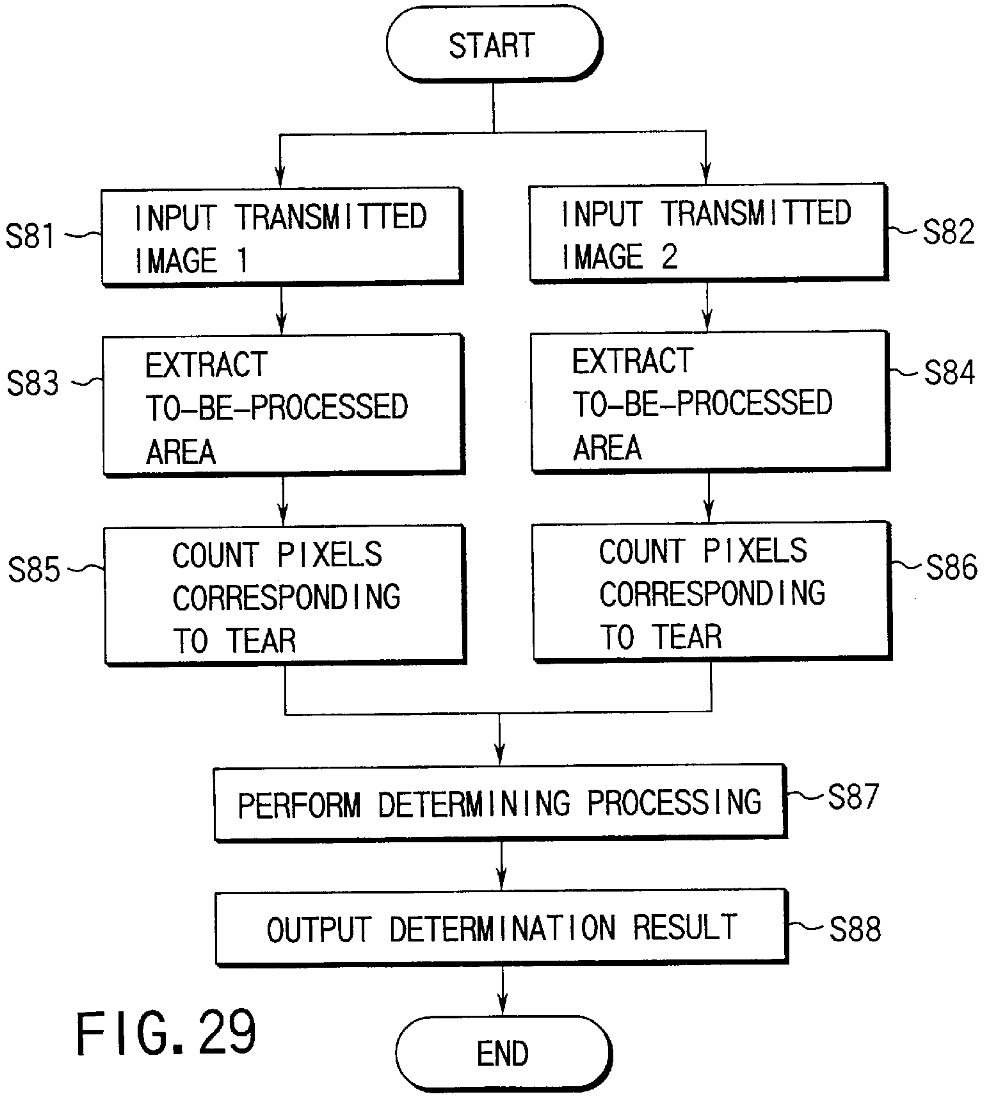
FIG. 29 is a flowchart useful in explaining the procedure of determination processing performed in the fifth embodiment.

Referring now to the flowchart of FIG. 29, the entire procedure of the determining process employed in the fifth embodiment will be described.

First, the transmitted-image input sections 20*a* and 20*b* input images of the printed matter P4 (S81, S82), thereby extracting particular areas (S83, S84). Subsequently, the tear extracting sections 21*a* and 21*b* detect, from the input images, pixels that have extremely high brightnesses, thereby counting the number of the detected pixels (S85, S86). Subsequently, the determining section 13 determines the soil degree of the basis of the detected pixels (S87), and outputs the determination result (S88).

Figure 30:
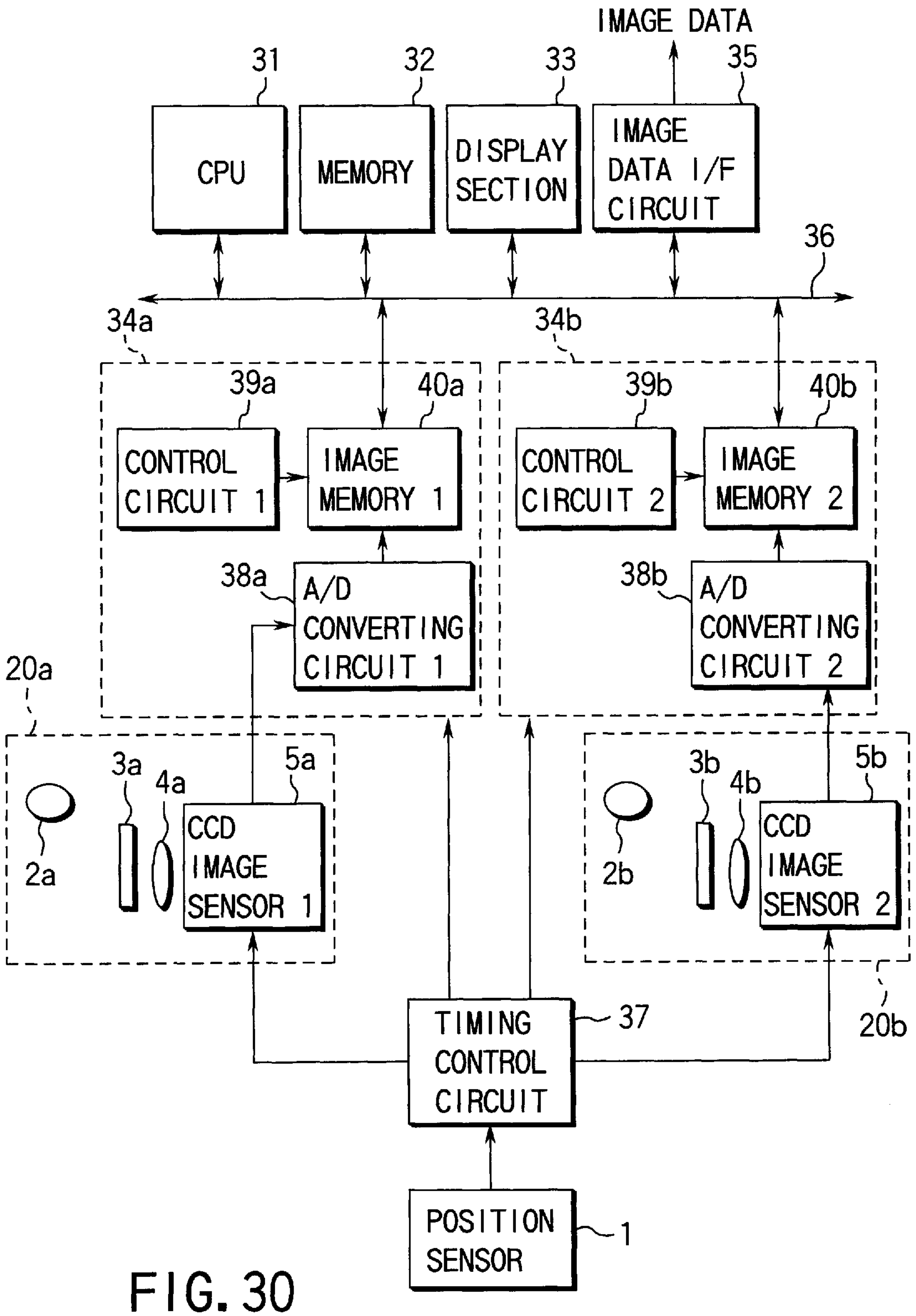
FIG. 30 is a block diagram illustrating the structure of the soil degree determination apparatus in more detail, according to the fifth embodiment, for determining soil degree of printed matter.

The structure of the soil degree determining apparatus of the fifth embodiment is realized by adding another image input section to the structure of the first embodiment shown in FIG. 9. In other words, a pair of transmitted-image input sections 20*a* and 20*b* and a pair of image memory control sections 34*a* and 34*b* are employed as shown in FIG. 30. However, it is not always necessary to employ an IR filter. Moreover, the contents stored in the memory 32 are changed to those illustrated in the flowchart of FIG. 29.

A sixth embodiment of the invention will be described.

Although the fifth embodiment uses the two transmitted-image input sections 20*a* and 20*b* for extracting tears of printed matter, the sixth embodiment described below and having a different structure from the fifth embodiment can also extract a tear without erroneously recognizing it to be a fold.

As described in the fifth embodiment, a tear may be erroneously determined to be a fold or a wrinkle that is formed at en edge of printed matter, if an image of a torn portion of the printed matter is input by only one image input system using transmitted light. To determine a tear by only one image input system using transmitted light, it is necessary to cause the CCD image sensor to directly receive, within its field of view, light emitted from the light source and having passed through a gap between two areas divided by a tear.

Figure 31:
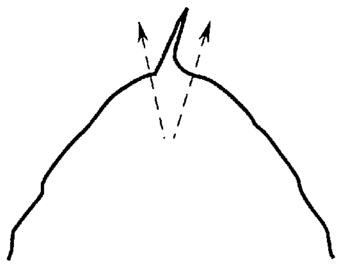
FIG. 31 is a view showing a state in which printed matter is transferred when inputting an image using transmitted light.

In other words, it is necessary to transfer printed matter so that a sufficient distance will be defined between two portions of the matter divided by a tear, on a plane perpendicular to a line formed by connecting the light source and the CCD image sensor, i.e. so that a clear gap is defined between the two portions divided by the tear. To this end, the printed matter is bent using its elasticity and a force is applied to each of the two portions to widen the gap therebetween, as is shown in FIG. 31.

Figure 32:
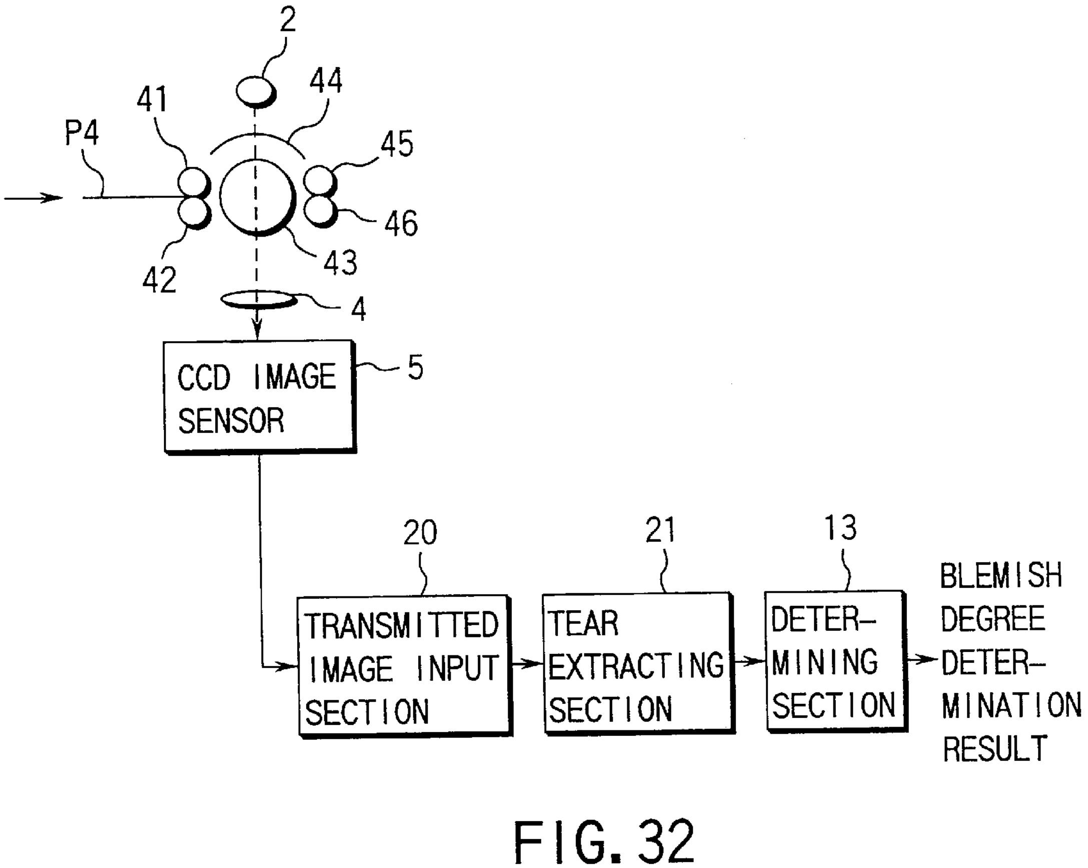
FIG. 32 is a block diagram illustrating the structure of a soil degree determination apparatus, according to a sixth embodiment, for determining soil degree of printed matter.
Figure 33A:
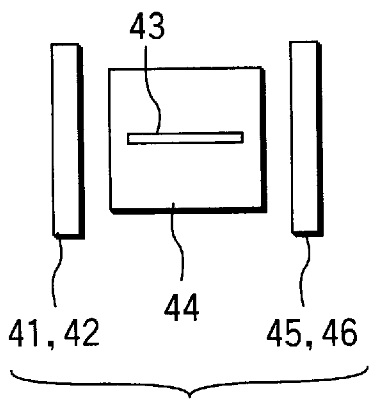
FIGS. 33A and 33B are schematic top and perspective views, respectively, illustrating a printed matter transfer system used for the transfer shown in FIG. 31.
Figure 33B:
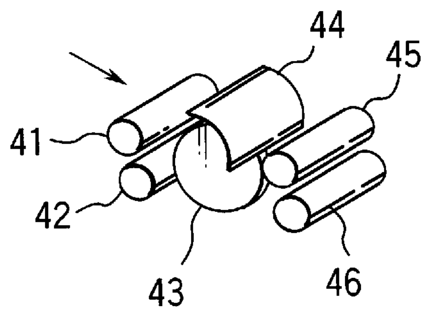

FIG. 32 schematically shows the structure of a soil degree determining apparatus for printed matter according to the sixth embodiment. FIG. 33A is a schematic top view showing a printed matter transfer system employed in the apparatus of FIG. 32, while FIG. 33B is a perspective view of the printed matter transfer system of FIG. 32.

In FIG. 32, after transferred in a direction indicated by the arrow, the printed matter P4 is further moved at a constant speed by transfer rollers 41 and 42 to a disk 43, where the matter P4 is pushed upward. While the printed matter P4 is urged against a transparent guide plate 44, the printed matter P4 is directed down to the lower right in FIG. 32, and the printed matter P4 is pulled by transfer rollers 45 and 46.

In the above-described structure, a light source 2 applies light onto the printed matter P4 from above the center of the disk.43, with the transparent guide plate 44 interposed therebetween, and the CCD image sensor 5 receives light transmitted through the printed matter P4. An image signal obtained by the CCD image sensor 5 using transmitted light is input to a transmitted-image input section 20.

The transmitted-image input section 20 is similar to the transmitted-image input section 20*a* or 20*b* employed in the fifth embodiment, except that the former does not include optical system units such as the light source 2, the lens 4 and the CCD image sensor 5.

The transmitted-image input section 20 converts, into digital data, the input transmitted-image data indicative of the printed matter P4, using an A/D converter circuit, thereby storing the digital data in an image memory and extracting a particular area therefrom. A tear extracting section 21 extracts a tear and counts the number of pixels corresponding to the tear. A determining section 13 determines the soil degree of the printed matter P4 on the basis of the counted number of the pixels.

The tear extracting section 21 and the determining section 13 have the same structures as the tear extracting section 21*a* and the determining section 13 employed in the fifth embodiment shown in FIG. 27.

A description will now be given of the state of the printed matter P4 obtained when an image thereof is input. When the center line SL4 of the printed matter P4, at which soiling will easily occur, has reached an uppermost portion of the disk 43, the horizontal ends of the printed matter P4 are held between the transfer rollers 41 and 42 and between the transfer rollers 45 and 46, respectively.

Accordingly, that portion of the printed matter P4, which is positioned on the uppermost portion of the disk 43, is warped. Therefore, if there is a tear on the center line SL4 at which soiling will easily occur, the same state occurs as that mentioned referring to FIG. 31. As a result, the two areas, divided by the tear and located on a plane perpendicular to the line formed by connecting the light source 2 to the CCD image sensor 5, separate from each other, which enables extraction of the tear as in the fifth embodiment.

Figure 34:
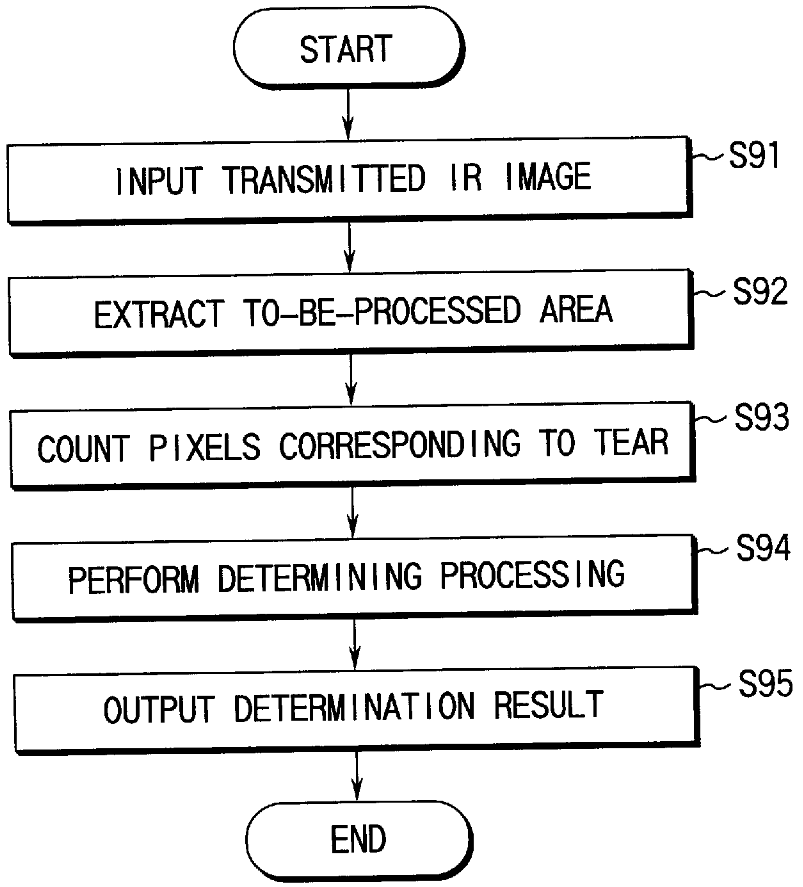
FIG. 34 is a flowchart useful in explaining the procedure of determination processing performed in the sixth embodiment.

Referring to the flowchart of FIG. 34, the entire procedure of determining processing executed in the sixth embodiment will be described.

First, the transmitted-image input section 20 inputs an image of the printed matter P4 (S91), thereby extracting a particular area (S92). Subsequently, the tear extracting section 21 extracts pixels of extremely high brightnesses from the input image, and counts the number of the extracted pixels (S93). After that, the determining section 13 determines the soil degree of the basis of the counted number of the pixels (S94), and outputs the determination result (S95).

The soil degree determining apparatus of the sixth embodiment has the same structure as the first embodiment except that the former does not include the IR image input section 10 (having the structure shown in FIG. 5A) using transmitted light, and the IR filter 3.

The gist of the present invention does not change even if similar soil called, for example, "a bend" or "a curve" is detected instead of "a fold", "a tear", "a hole" or "a cutout space" detected in the above embodiments.

Moreover, although an area of printed matter transferred in a direction parallel to its length, which includes the vertical center line and its vicinity, is processed in the above-described embodiments, the invention is not limited to this. For example, the invention can also process an area of printed matter transferred in a direction parallel to its width, which includes the horizontal center line and its vicinity, or areas of printed matter divided into three portions, which include two horizontal lines and their vicinities.

In addition, the area from which a fold or a tear can be detected is not limited to an area within printed matter as shown in FIG. 7. Any area can be detected only if it is located within a certain distance from the center line SL1 in FIG. 1A.

As described above in detail, the present invention can provide a soil degree determining apparatus that can determine, as humans do, a fold of a printed area of printed matter, unlike the conventional apparatuses.

The invention can also provide a soil degree determining apparatus capable of discriminating between a fold and a tear of printed matter, which cannot be distinguished in the prior art.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A soil degree determining apparatus for determining soiling on printed matter, comprising:

image input means for inputting an image of printed matter to be subjected to soiling determination, image extracting means for extracting image data in a particular area including a printed area, from the image input by the image input means, changed-section extracting means for extracting, on the basis of the image data in the particular area extracted by the image extracting means, a non-reversible changed section, thereby providing data concerning the non-reversible changed section, feature quantity extracting means for extracting a feature quantity indicative of a degree of non-reversible change in the particular area, on the basis of the data concerning the non-reversible changed section provided by the changed-section extracting means, and determining means for estimating the soil degree based on the feature quantity extracted by the feature quantity extracting means, wherein the image input means is adapted for inputting the image as an IR image using IR light having a near-infrared wavelength, the changed-section extracting means includes image emphasizing means adapted for emphasizing a wrinkle and/or a fold in the particular area caused when the printed matter is folded, thereby providing emphasized image data, and the changed-section extracting means is adapted for extracting the non-reversible changed section from the emphasized image data.

2. An apparatus according to claim 1, wherein the image input means has an IR filter for filtering wavelength components other than the near-infrared wavelength.

3. An apparatus according to claim 1, wherein the image input means inputs the IR image of the printed matter, using at least one of light transmitted through the printed matter and light reflected from the printed matter.

4. An apparatus according to claim 1, wherein the feature quantity extracting means includes at least one of extracted-pixel counting means for counting pixels corresponding to the data concerning the non-reversible changed section extracted by the changed-section extracting means; average density measuring means for measuring that average density of the pixels corresponding to the non-reversible changed section, which is obtained when the IR image is input by the image input means, and means for calculating a variance, in the particular area, of the pixels corresponding to the extracted non-reversible changed section.

5. An apparatus according to claim 1, further comprising linear-line determining means for determining a linear-line area in the particular area on the basis of the data concerning the non-reversible changed section provided by the changed-section extracting means, and wherein the feature quantity extracting means includes extracted-pixel counting means for counting pixels in the linear-line area determined by the linear-line determining means, and average density measuring means for measuring an average density of the pixels in the linear-line area, which is obtained when the IR image is input by the image input means.

6. An apparatus according to claim 1, wherein the changed-section extracting means has means for masking a predetermined area in the particular area, and means for extracting the non-reversible changed section which is included in the particular area except for the predetermined area, and providing data concerning the non-reversible changed section.

7. An apparatus according to claim 1, wherein the image input means has first and second image input means using transmitted light, and the first and second image input means each have tear extracting means for extracting pixels indicative of a tear which is formed at an edge portion of the printed matter, and providing a number of the extracted pixels as the feature quantity.

8. An apparatus according to claim 1, wherein the image emphasizing means has means for emphasizing the non-reversible changed section in the particular area, using a pixel weight matrix.

9. An apparatus according to claim 1, wherein the image emphasizing means has means for emphasizing the non-reversible changed section in the particular area, using a maximum/minimum filter.

* * * * *